United States Patent
Ghosh et al.

(10) Patent No.: US 10,128,989 B2
(45) Date of Patent: Nov. 13, 2018

(54) STATION (STA), ACCESS POINT (AP) AND METHOD FOR AGGREGATION OF DATA PACKETS FOR UPLINK TRANSMISSION

(71) Applicant: Intel IP Corporation, Santa Clara, CA (US)

(72) Inventors: Chittabrata Ghosh, Fremont, CA (US); Yaron Alpert, Hod Hasharoni (IL); Robert J. Stacey, Portland, OR (US); Daniel F. Bravo, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 135 days.

(21) Appl. No.: 15/200,485

(22) Filed: Jul. 1, 2016

(65) Prior Publication Data

US 2017/0257196 A1    Sep. 7, 2017

Related U.S. Application Data

(60) Provisional application No. 62/301,915, filed on Mar. 1, 2016.

(51) Int. Cl.
*H04W 84/12* (2009.01)
*H04L 1/18* (2006.01)
*H04L 1/16* (2006.01)
*H04W 28/06* (2009.01)

(52) U.S. Cl.
CPC .......... *H04L 1/1854* (2013.01); *H04L 1/1614* (2013.01); *H04W 28/065* (2013.01); *H04W 84/12* (2013.01)

(58) Field of Classification Search
CPC . H04J 3/14; H04L 1/243; H04L 43/50; H04B 17/0012; H04B 17/028; H04W 80/04; H04W 84/12; H04W 88/06; H04W 88/08; H04W 84/18
USPC ..... 370/349, 328, 338, 310.2, 471, 473, 377
See application file for complete search history.

(56) References Cited

U.S. PATENT DOCUMENTS

| 9,661,647 B2 * | 5/2017 | Liu | H04W 72/121 |
| 2015/0085775 A1 * | 3/2015 | Choi | H04W 74/0808 370/329 |
| 2015/0146648 A1 * | 5/2015 | Viger | H04L 1/1621 370/329 |
| 2016/0029373 A1 * | 1/2016 | Seok | H04L 5/0055 370/338 |
| 2016/0066208 A1 * | 3/2016 | Baron | H04W 74/085 370/230 |

(Continued)

*Primary Examiner* — Brenda H Pham
(74) *Attorney, Agent, or Firm* — Schwegman Lundberg & Woessner, P.A.

(57) ABSTRACT

Embodiments of a station (STA), access point (AP) and method for aggregation of data packets are generally described herein. The AP may transmit a trigger frame (TF) to an STA that indicates an access class (AC) constraint parameter and a traffic identifier (TID) aggregation limit parameter. The STA may select a group of aggregate TIDs from which medium access control (MAC) protocol data units (MPDUs) may be aggregated into an aggregated MPDU (A-MPDU). The AC constraint parameter may indicate a recommended AC from which at least a portion of the aggregate TIDs are to be selected. The TID aggregation limit parameter may indicate a number of TIDs to be selected for the group of aggregate TIDs.

26 Claims, 13 Drawing Sheets

(56) References Cited

U.S. PATENT DOCUMENTS

| | | | |
|---|---|---|---|
| 2016/0073340 A1* | 3/2016 | Xue | H04W 52/0212 |
| | | | 455/522 |
| 2016/0150505 A1* | 5/2016 | Hedayat | H04L 69/22 |
| | | | 370/329 |
| 2017/0078003 A1* | 3/2017 | Ghosh | H04B 7/0452 |

* cited by examiner

500

| 503 — ACCESS CLASS (AC): | 510 VOICE (AC_VO) | 520 VIDEO (AC_VI) | 530 BEST EFFORT (AC_BE) | 540 BACKGROUND (AC_BK) |
|---|---|---|---|---|
| 505 — PRIORITY: | HIGHEST | • • • | • • • | LOWEST |
| 507 — TIDs: | TID-7, TID-6 | TID-5, TID-4 | TID-3, TID-2 | TID-1, TID-0 |

STATION (STA), ACCESS POINT (AP) AND METHOD FOR AGGREGATION OF DATA PACKETS FOR UPLINK TRANSMISSION

PRIORITY CLAIM

This application claims priority under 35 USC 119(e) to U.S. Provisional Patent Application Ser. No. 62/301,915, filed Mar. 1, 2016 which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (named DensiFi). Some embodiments relate to high-efficiency (HE) wireless or high-efficiency WLAN or Wi-Fi (HEW) communications. Some embodiments relate to trigger frames (TFs). Some embodiments relate to aggregation of packets. Some embodiments relate to traffic identifiers (TIDs). Some embodiments relate to multi-TID aggregation. Some embodiments relate to access classes (ACs).

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
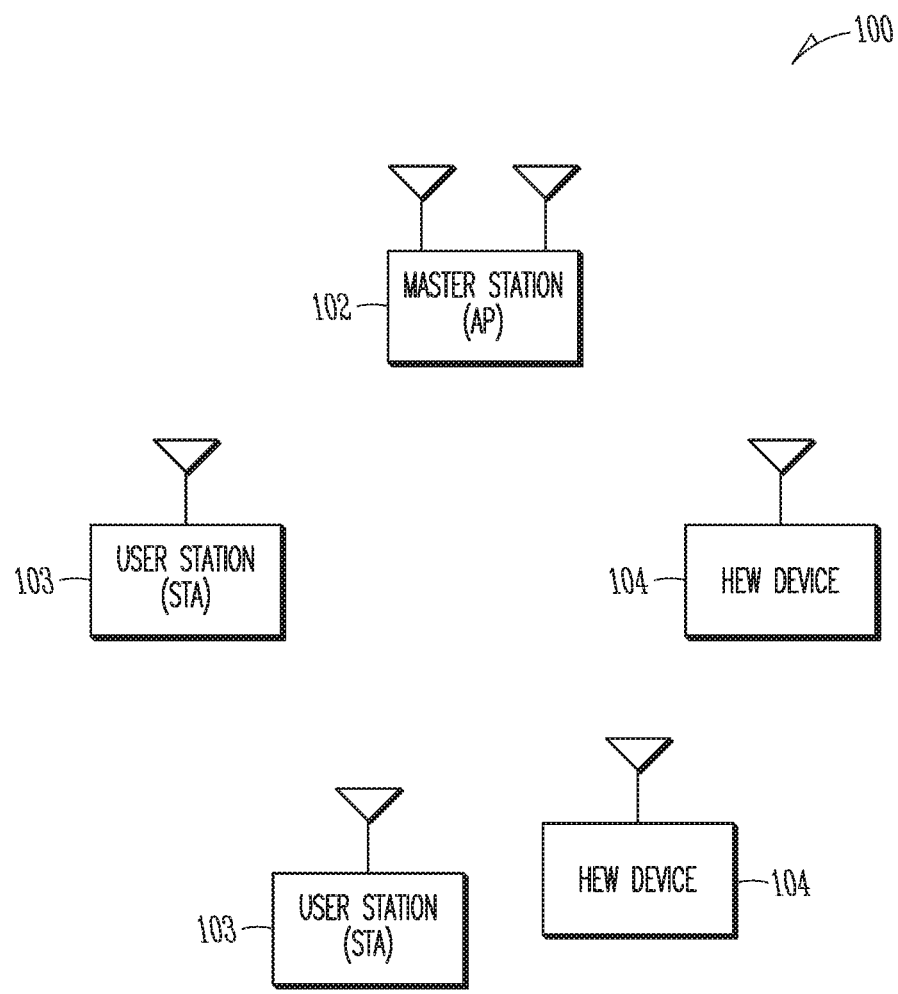
FIG. 1 illustrates a wireless network in accordance with some embodiments.

FIG. 1 illustrates a wireless network in accordance with some embodiments. In some embodiments, the network 100 may be a High Efficiency Wireless (HEW) Local Area Network (LAN) network. In some embodiments, the network 100 may be a Wireless Local Area Network (WLAN) or a Wi-Fi network. These embodiments are not limiting, however, as some embodiments of the network 100 may include a combination of such networks. That is, the network 100 may support HEW devices in some cases, non HEW devices in some cases, and a combination of HEW devices and non HEW devices in some cases. Accordingly, it is understood that although techniques described herein may refer to either a non HEW device or to an HEW device, such techniques may be applicable to both non HEW devices and HEW devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HEW devices 104. In some embodiments, the AP 102 may transmit a trigger frame (TF) to an STA 103 to indicate that the STA 103 is to perform an uplink data transmission to the AP. In addition, the STA 103 may transmit uplink data packets, including aggregated packets, to the AP 102. The AP 102 may transmit one or more block acknowledgement (BA) messages for the uplink data packets, in some cases. These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to the master station 102 are also not limiting. In some embodiments, a STA 103, HEW device 104 and/or other device may be configurable to operate as a master station. Accordingly, in such embodiments, operations that may be performed by the AP 102 as described herein may be performed by the STA 103, HEW device 104 and/or other device that is configurable to operate as the master station.

In some embodiments, one or more of the STAs 103 may be legacy stations (such as IEEE 802.11b/a/g, IEEE 802.11n, IEEE 802.11ac stations). These embodiments are not limiting, however, as the STAs 103 may be configured to operate as HEW devices 104 or may support HEW operation in some embodiments. The master station 102 may be arranged to communicate with the STAs 103 and/or the HEW stations 104 in accordance with one or more of the IEEE 802.11 standards, including 802.11ax and/or others. In accordance with some HEW embodiments, an access point (AP) may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, STAs 103 not operating as HEW devices may refrain from communicating in some cases. In some embodiments, the master-sync transmission may be referred to as a control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications. In some embodiments, a combination of techniques may be used, such as a combination of OFDMA and MU-MIMO.

The master station 102 may also communicate with STAs 103 and/or other legacy stations in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

In some embodiments, the HEW communications during the control period may be configurable to use one of 20 MHz, 40 MHz, or 80 MHz contiguous bandwidths or an 80+80 MHz (160 MHz) or a 320 MHz non-contiguous bandwidth. In some embodiments, a 320 MHz channel width may be used. In some embodiments, sub-channel bandwidths less than 20 MHz may also be used. In these embodiments, each channel or sub-channel of an HEW communication may be configured for transmitting a number of spatial streams.

In some embodiments, OFDMA signals may be exchanged between the AP 102 and one or more STAs 103. As part of OFDMA transmission, channel resources (such as a frequency band available for usage) may be divided, allocated and/or partitioned into portions that may include resource units (RUs), resource blocks (RBs), sub-carriers, sub-channels, groups of sub-carriers and/or other frequency unit. Although embodiments are not limited as such, the portions may be non-overlapping, in some embodiments. For instance, non-overlapping RUs may be used. In addition, the RUs may include non-overlapping sub-carriers, in some embodiments. Embodiments are not limited to OFDMA signals, however, as CDMA signals, SC-FDMA signals and/or other signals may be exchanged, in some embodiments.

As an example, one or more STAs 103 may transmit uplink OFDMA signals to the AP 102. For instance, a first portion (such as a first group of one or more RUs) of the channel resources may be used by a first STA 103 for transmission of a first uplink OFDMA signal and a second portion of the channel resources (such as a second group of one or more RUs) may be used by a second STA 103 for transmission of a second uplink OFDMA signal. This example is not limited to two STAs 103, however, and may be extended to accommodate more than the two STAs 103. In some cases, an STA 103 may transmit an uplink orthogonal frequency division multiplexing (OFDM) signal to the AP 102. In some embodiments, multi-user multiple input multiple output (MU-MIMO) techniques may be used by the STA 103 for uplink transmission. In some embodiments, a combination of OFDMA and MU-MIMO may be used by the STA 103 for uplink transmission.

As another example, the AP 102 may transmit downlink OFDMA signals to one or more STAs 103. For instance, a first portion (such as a first group of one or more RUs) of the channel resources may be used to transmit signals to a first STA 103 and a second portion of the channel resources (such as a second group of one or more RUs) may be used to transmit signals to a second STA 103. This example is not limited to two STAs 103, however, and may be extended to accommodate more than the two STAs 103. In some cases, the AP 102 may transmit an OFDM signal to a single STA 103.

Different RU bandwidths and/or RU sizes may be used, in some embodiments. Accordingly, RUs of different bandwidths/sizes may include different numbers of sub-carriers. As a non-limiting example, a sub-carrier spacing of 78.125 kHz may be used. The RUs may include 26, 52, 106 or 242 sub-carriers, which may correspond to effective bandwidths of 2.03125, 4.0625, 8.28125, and 18.90625 MHz, respectively. As an example, the 18.90625 MHz effective bandwidth may be considered a 20 MHz bandwidth, in some cases. It should be noted that the RUs are not necessarily contiguous in frequency. It should also be noted that some parameters and example values, such as the sub-carrier spacing, RUs, RU bandwidths/sizes, number of sub-carriers per RU and/or other parameters, may be included in an 802.11 standard and/or other standard, in some cases, although embodiments are not limited to those parameters or values.

In some embodiments, a frame, signal, message and/or other element may be exchanged, transmitted and/or received in accordance with contention based techniques. In some embodiments, a transmission of the frame, signal, message and/or other element may be performed after detection of an inactivity period of the channel to be used for the transmission. For instance, it may be determined, based on channel sensing, that the channel is available. As a non-limiting example, a minimum time duration for the inactivity period may be based on an inter-frame spacing (IFS), which may be included in an 802.11 standard and/or other standard. That is, when inactivity is detected for a time duration that is greater than or equal to the IFS, the channel may be determined to be available. Embodiments are not limited to usage of the IFS, however, as other time durations, which may or may not be included in a standard, may be used in some cases. In addition, back-off techniques may also be used, in some embodiments.

In some embodiments, high-efficiency wireless (HEW) techniques may be used, although the scope of embodiments is not limited in this respect. As an example, techniques included in 802.11ax standards and/or other standards may be used. In accordance with some embodiments, a master station 102 and/or HEW stations 104 may generate an HEW packet in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
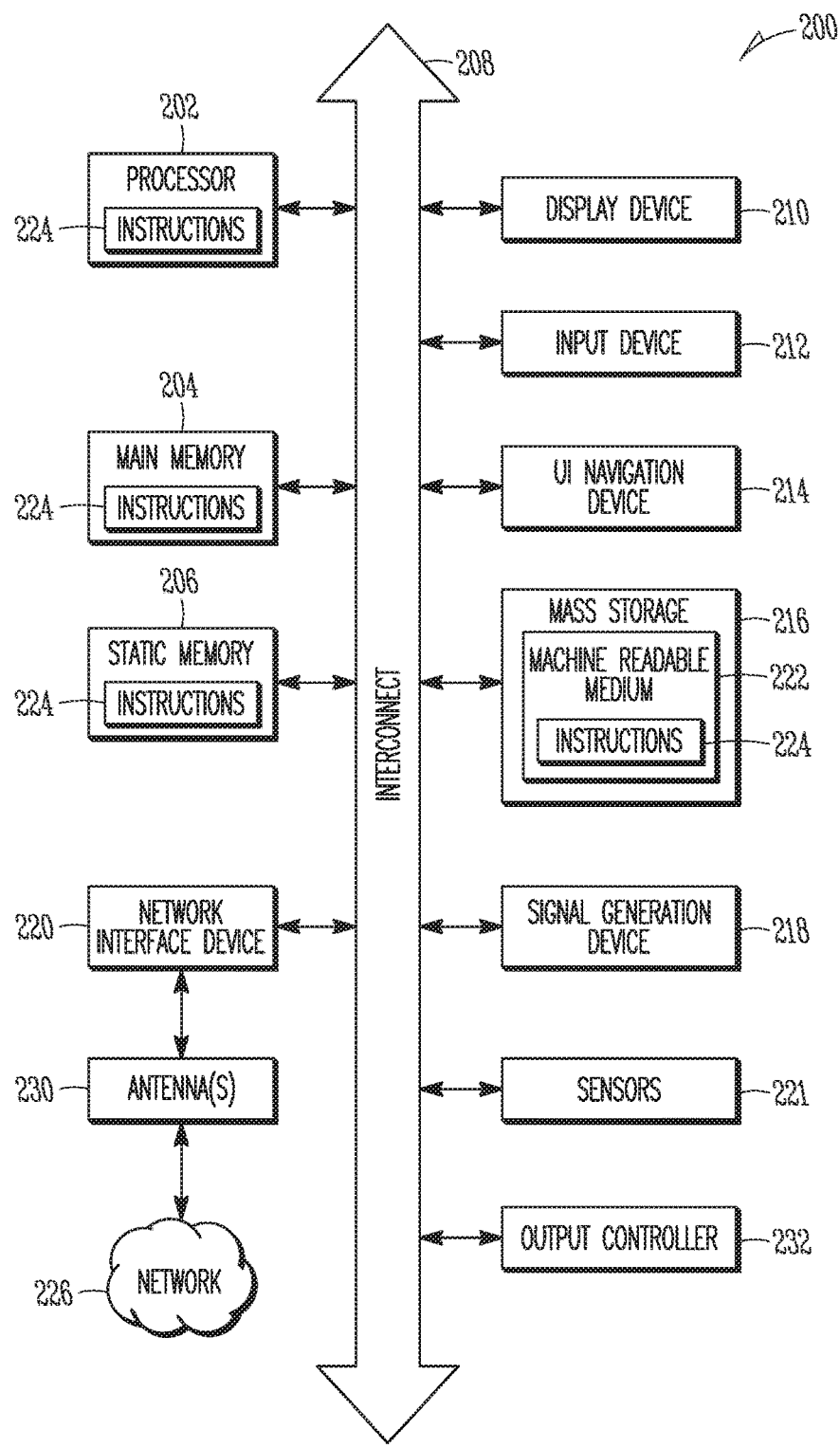
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, HEW device, HEW AP, HEW STA, UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
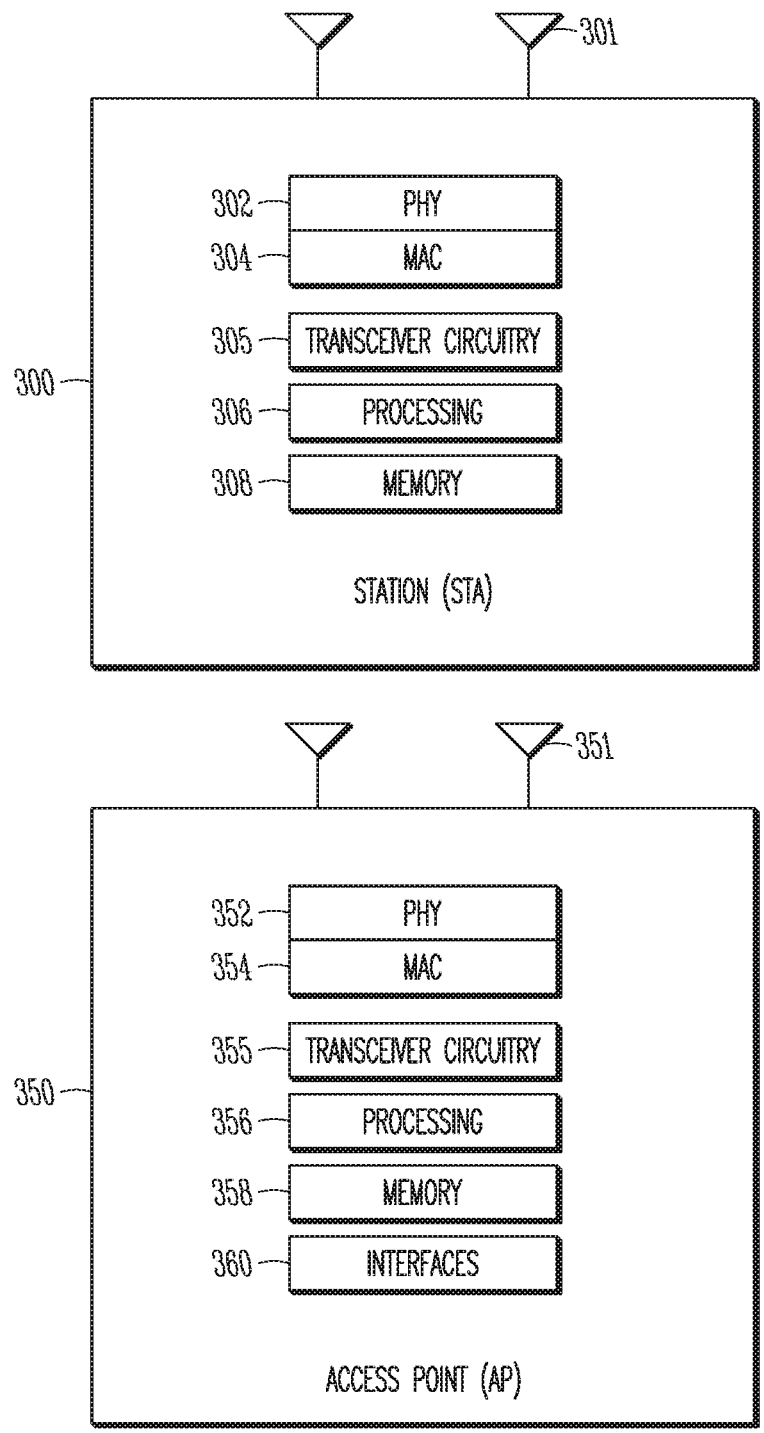
FIG. 3 illustrates a station (STA) in accordance with some embodiments and an access point (AP) in accordance with some embodiments.

FIG. 3 illustrates a station (STA) in accordance with some embodiments and an access point (AP) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control layer (MAC) circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control layer (MAC) circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HEW device 104 (FIG. 1), and may communicate using OFDM and/or OFDMA communication signals over a multicarrier communication channel. In some embodiments, the AP 350 may be configured to communicate using OFDM and/or OFDMA communication signals over a multicarrier communication channel. In some embodiments, the HEW device 104 may be configured to communicate using OFDM communication signals over a multicarrier communication channel. Accordingly, in some cases, the STA 300, AP 350 and/or HEW device 104 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the embodiments is not limited in this respect as they may also be suitable to transmit and/or receive communications in accordance with other techniques and standards. In some other embodiments, the AP 350, HEW device 104 and/or the STA 300 configured as an HEW device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

In accordance with some embodiments, the AP 102 may transmit a trigger frame (TF) to an STA 103 that indicates an access class (AC) constraint parameter and a traffic identifier (TID) aggregation limit parameter. The STA 103 may select a group of aggregate TIDs from which medium access control (MAC) protocol data units (MPDUs) may be aggregated into an aggregated MPDU (A-MPDU). The AC constraint parameter may indicate a recommended AC (and/or preferred AC) from which at least a portion of the aggregate TIDs are to be selected. The TID aggregation limit parameter may indicate a number of TIDs to be selected for the group of aggregate TIDs. The STA 103 may aggregate MPDUs from the aggregate TIDs into an A-MPDU, and may transmit the A-MPDU to the AP 102. These embodiments will be described in more detail below.

Figure 4:
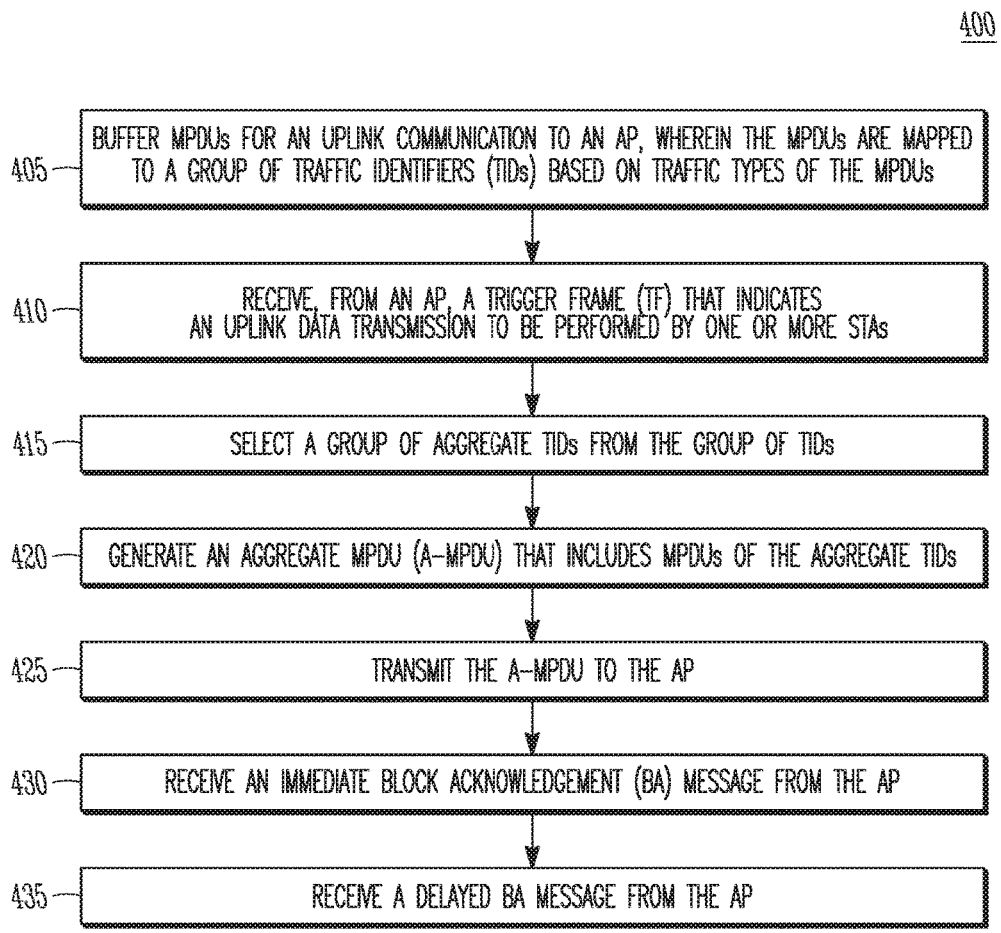
FIG. 4 illustrates the operation of a method of communication in accordance with some embodiments.

FIG. 4 illustrates the operation of a method of communication in accordance with some embodiments. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-13, although it is understood that the method 400 may be practiced with any other suitable systems, interfaces and components.

In some embodiments, the STA 103 may be configurable to operate as an HEW device 104. Although reference may be made to an STA 103 herein, including as part of the descriptions of the method 400 and/or other methods described herein, it is understood that an HEW device 104 and/or STA 103 configurable to operate as an HEW device 104 may be used in some embodiments. In addition, the method 400 and other methods described herein may refer to STAs 103, HEW devices 104 and/or APs 102 operating in accordance with one or more standards and/or protocols, such as 802.11, Wi-Fi, wireless local area network (WLAN) and/or other, but embodiments of those methods are not limited to just those devices. In some embodiments, the method 400 and other methods described herein may be practiced by other mobile devices, such as an Evolved Node-B (eNB) or User Equipment (UE). The method 400 and other methods described herein may also be practiced by wireless devices configured to operate in other suitable types of wireless communication systems, including systems configured to operate according to various Third Generation Partnership Project (3GPP) Long Term Evolution (LTE) standards. The method 400 may also be applicable to an apparatus for an STA 103, HEW device 104 and/or AP 102 or other device described above, in some embodiments.

It should also be noted that embodiments are not limited by references herein (such as in descriptions of the methods 400, 1300 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 405 of the method 400, the STA 103 may buffer one or more medium access control (MAC) protocol data units (MPDUs). In some embodiments, the MPDUs may be mapped to a group of traffic identifiers (TIDs) based on traffic types of the MPDUs. As an example, the MPDUs may be mapped to a group of TIDs that are included in a Quality of Service (QoS) arrangement. In some cases, the TIDs may be related to traffic types of the MPDUs, prioritization of the traffic types and/or other aspects of the QoS arrangement.

In some embodiments, the group of TIDs to which the MPDUs are mapped may be a group of active TIDs (for which buffered traffic is buffered at the STA 103). The group of TIDs to which the MPDUs are mapped may be a group of candidate TIDs, in some embodiments, such as TIDs that are candidates for the aggregation to be described below. In some embodiments, the group of TIDs to which the MPDUs are mapped may be a master group of TIDs, such as a group of possible TIDs of a QoS prioritization and/or standard. Accordingly, it is understood that references to one of those groups (a group of TIDs, a group of candidate TIDs, a master group of TIDs) are not limiting. In some embodiments, an operation, method and/or technique described using one of those groups may also be applicable to an embodiment that uses one of the other groups.

In some embodiments, the TIDs of the group may be mapped to a group of access classes (ACs) of a quality of service (QoS) prioritization. Examples of ACs may include, but are not limited to, a voice AC, a video AC, a best effort AC, and a background AC. As a non-limiting example, the group of ACs may include a voice AC of a highest QoS priority, a video AC of a second highest QoS priority, a best effort AC of a third highest QoS priority, and a background AC of a lowest QoS priority.

Figures 5, 6:
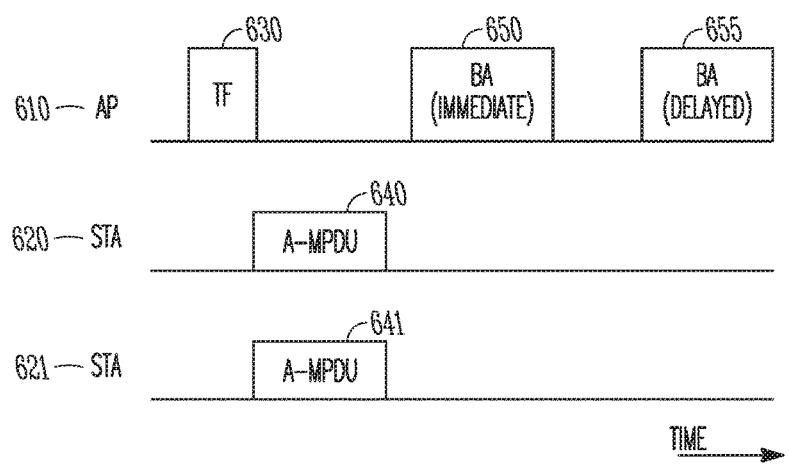
FIG. 5 illustrates examples of access classes (ACs) and traffic types in accordance with some embodiments.
FIG. 6 illustrates example frames and packets that may be exchanged in accordance with some embodiments.

FIG. 5 illustrates examples of access classes (ACs) and traffic types in accordance with some embodiments. It should be noted that the examples shown in FIG. 5 may illustrate some or all of the concepts and techniques described herein in some cases, but embodiments are not limited by the examples. For instance, embodiments are not limited by the name, number, type, size, ordering, arrangement, prioritization, mapping and/or other aspects of the ACs, traffic types, TIDs and other elements as shown in FIG. 5. Although some of the elements shown in the example of FIG. 5 may be included in an 802.11 standard and/or other standard, embodiments are not limited to usage of such elements that are included in standards.

In some embodiments, the example arrangement 500 may be part of a QoS prioritization and/or QoS arrangement, although the scope of embodiments is not limited in this respect. As indicated by row 503, different ACs may include a voice AC 510, video AC 520, best effort AC 530, and background AC 540. In addition, those ACs may be labeled as AC_VO, AC_VI, AC_BE, and AC_BK, respectively, as part of an 802.11 standard and/or other standard, in some cases. Example priorities of the ACs 510-540 are indicated by row 505. In this example 500, the voice AC, video AC, best effort AC, and background AC may be prioritized from highest to lowest, respectively.

In some embodiments, one or more TIDs may be mapped to the ACs. Accordingly, each AC may include and/or support one or more TIDs, in some cases. In the example arrangement 500, as indicated by row 507, two TIDs may be mapped to each AC. For instance, the TIDs labeled as TID-7 and TID-6 may be mapped to the voice AC 510, the TIDs labeled as TID-5 and TID-4 may be mapped to the video AC 520, the TIDs labeled as TID-3 and TID-2 may be mapped to the best effort AC 530, and the TIDs labeled as TID-1 and TID-0 may be mapped to the background AC 540. It should be noted that embodiments are not limited to those labels and are also not limited to mapping of two TIDs to each AC. In some embodiments, unequal numbers of TIDs may be mapped to each AC. In some embodiments, any suitable number of TIDs (such as one, two, three or more) may be mapped to any of the TIDs.

At operation 410 of the method 400, the STA 103 may receive a trigger frame (TF) from the AP 102. In some embodiments, the TF may indicate that the STA 103 is to perform uplink data transmissions and may include related control information. In some cases, the TF may initiate the uplink data transmissions. In some embodiments, the TF may include information related to aggregation of packets by the STA 103, such as an AC constraint parameter (to be described below), a TID aggregation limit parameter (to be described below) and/or other parameters. The TID aggregation limit parameter and the AC constraint parameter may be included in a common information field of the TF, in some cases, although the scope of embodiments is not limited in this respect. As an example of a packet aggregation technique, MPDUs may be aggregated into an aggregated MPDU (A-MPDU).

In some embodiments, the TID aggregation limit parameter and the AC constraint parameter may be included in a group of implicit construction parameters. The group of aggregate TIDs may be selected in accordance with an implicit construction based on the implicit construction parameters. Accordingly, the AP 102 may refrain from indicating explicitly, to the STA 103, information such as which TIDs are to be included in the group of aggregate TIDs, which MPDUs are to be aggregated and/or other information. In some embodiments, the STA 103 and the AP 102 may exchange one or more messages for negotiation of one or more parameters, including but not limited to the TID aggregation limit, AC constraint parameter, preferred AC parameter, the quality of service (QoS) prioritization of the ACs and/or others.

It should be noted that the TF may be a uni-cast TF, a multi-cast TF and/or other type of TF. As an example, the TF may be configurable to indicate to any number of STAs 103 (such as one or more) that uplink data transmission(s) are to be performed. As another example, the TF may be a uni-cast TF that may be transmitted to an STA 103 to indicate that STA 103 is to perform one or more uplink transmissions. In some cases, the STA 103 may perform the one or more uplink transmissions in accordance with control information included in the uni-cast TF.

As another example, the TF may be a multi-cast TF that may be transmitted to a group of STAs 103 to indicate that one or more of the STAs 103 are to perform one or more uplink transmissions. In some cases, the STA 103 may perform the one or more uplink transmissions in accordance with control information included in the multi-cast TF. The control information may include control information for each STA 103 in some cases, such as a per user information block, although embodiments are not limited as such.

In some cases, the TF (uni-cast, multi-cast and/or other type of TF) may also include common control information which may not necessarily be dedicated to any particular STA 103. In addition, uplink data transmissions may be performed, in some cases, in accordance with such common control information and/or dedicated control information (such as per STA 103 control information). Examples of common control information may include configuration information, system information and/or other information that may not necessarily be specific to the intended uplink data transmission indicated by the TFs.

Figure 7:
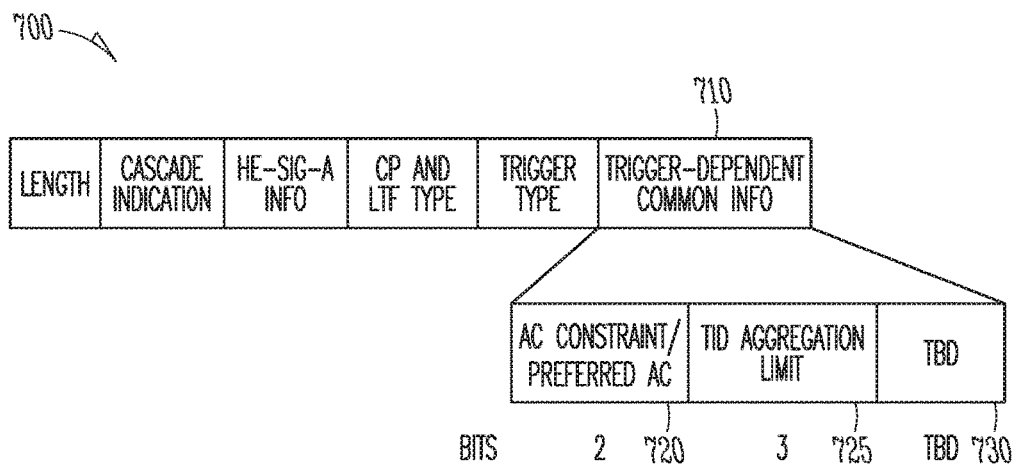
FIG. 7 illustrates an example Trigger Frame (TF) and example control fields in accordance with some embodiments.
Figure 7:
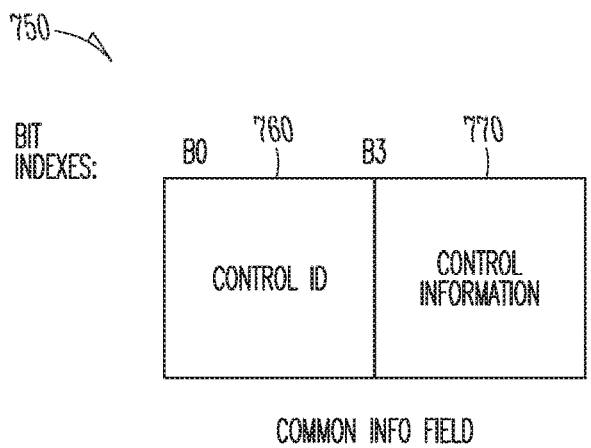
Figure 14:
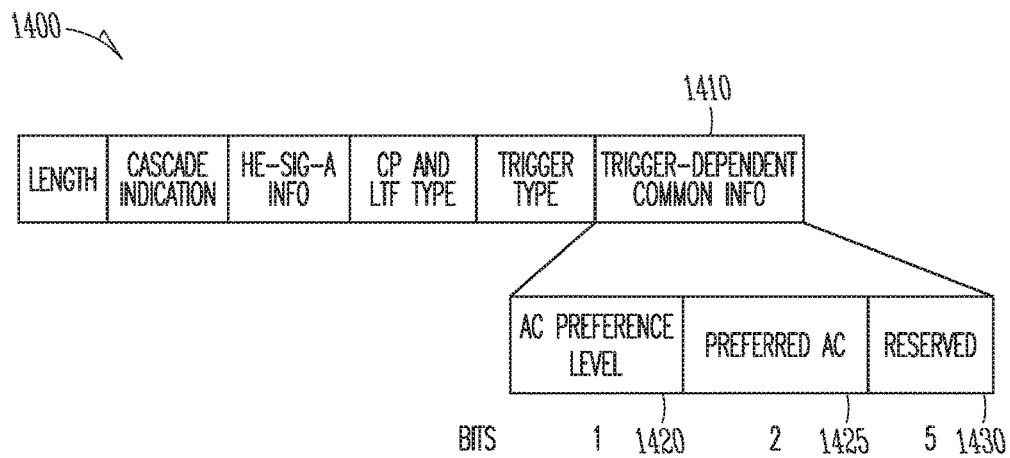
FIG. 14 illustrates additional examples of TFs and additional examples of control fields in accordance with some embodiments.
Figure 14:
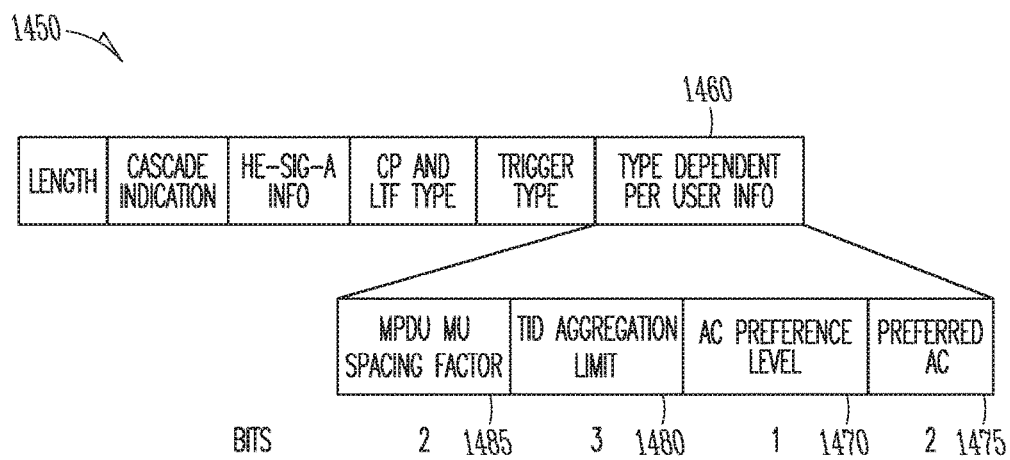

FIG. 6 illustrates example frames and packets that may be exchanged in accordance with some embodiments. FIG. 7 illustrates example control fields in accordance with some embodiments. FIG. 14 illustrates additional examples of TFs and additional examples of control fields in accordance with some embodiments. It should be noted that the examples shown in FIGS. 6, 7, and 14 may illustrate some or all of the concepts and techniques described herein in some cases, but embodiments are not limited by the examples. For instance, embodiments are not limited by the name, number, type, size, ordering, arrangement and/or other aspects of the frames, signals, data blocks, control headers and other elements as shown in FIGS. 6, 7, and 14. In addition, embodiments are also not limited to the number of STAs 103 used in any of the examples shown in FIGS. 6, 7, and 14. Although some of the elements shown in the examples of FIGS. 6, 7, and 14 may be included in an 802.11 standard and/or other standard, embodiments are not limited to usage of such elements that are included in standards.

In the example scenario 600, two STAs 620 and 621 are shown, but it is understood that embodiments may be extended to include more than the two STAs 620, 621. Some embodiments may include a single STA, such as 620. The AP 610 may transmit the TF 630 to initiate and/or trigger UL transmissions by one or more of the STAs 620, 621 It should be noted that the TF 630 may be or may include a uni-cast TF transmitted to one STA (such as 620), in some cases. Embodiments are not limited as such, however, as the TF may be or may include a multi-cast TF and/or broadcast TF, in some cases, which may be transmitted to multiple STAs.

Referring to FIG. 7, the example TF 700 may include trigger dependent common information 710 (such as a common information field), which may include the AC constraint parameter 720 and the TID aggregation limit parameter 725. It should be noted that a preferred AC parameter 720 may be used in some embodiments. In addition, references herein to either the AC constraint parameter 720 or the preferred AC parameter 720 are not limiting. Accordingly, an operation, method, technique, frame and/or other element may be described in terms of one of those parameters, but it is understood that the other of those parameters may also be used in some cases. As an example, in some descriptions herein, an operation, method, technique, frame and/or other element may include or may use an AC constraint parameter. It is understood, however, that the preferred AC parameter may be used in the operation, method, technique, frame and/or other element, in some cases.

In addition, references herein to either a recommended AC or a preferred AC are not limiting. Accordingly, an operation, method, technique, frame and/or other element may be described in terms of one of those parameters, but it is understood that the other of those parameters may also be used in some cases. As an example, in some descriptions herein, an operation, method, technique, frame and/or other element may include or may use a recommended AC. It is understood, however, that a preferred AC may be used in the operation, method, technique, frame and/or other element, in some cases.

The trigger dependent common information 710 may include any number (including zero) of other parameters or information that may or may not be related to MPDU aggregation. It should also be noted that the example TF 700 may include various fields as shown in FIG. 7, such as length, cascade indication, HE Sig-A information, CP and LTF type, trigger type and/or others. However, it is understood that, in some embodiments, the TF 700 and/or the trigger-dependent common information 710 may not necessarily include all of the fields shown in FIG. 7 and may even include additional fields.

Referring to FIG. 14, the example TF 1400 may include type dependent common information 1410, which may include the AC preference level parameter 1420 and/or the preferred AC parameter 1425. In addition, other parameters or information may be possible in some embodiments, as indicated by the "reserved" field 1430. For instance, any number (including zero) of other parameters or information that may or may not be related to MPDU aggregation may be used, in some cases.

In some embodiments, if a TF is of a type "Basic," the type dependent common information 1410 may include the AC preference level parameter 1420 and/or the preferred AC parameter 1425. The AC preference level parameter 1420 may indicate that the TIDs of corresponding signaled AC in the preferred AC parameter 1425 should be preferred over other TIDs when MPDUs are aggregated within the multi-TIF A-MPDU. The preferred AC parameter 1425 may indicate a value of AC recommended (and/or preferred) by the AP 102 from which MPDUs are to be aggregated primarily within a multi-TID A-MPDU. As a non-limiting example, values of 00, 01, 10, and 11 may indicate AC_VO, AC_VI, AC_BE, and AC_BK, respectively. It is understood that the mapping of values is not limiting. It is also understood that the preferred AC parameter may be mapped to a different set of cases, in some embodiments.

The example TF 1450 may include type dependent per user information 1460, which may include the AC preference level parameter 1470, the preferred AC parameter 1475, MPDU MU spacing factor 1485 and/or TID aggregation limit 1480. In addition, other parameters or information may be possible in some embodiments, such as any number (including zero) of other parameters or information that may or may not be related to MPDU aggregation may be used.

In some embodiments, if a TF is of a type "Basic," the type dependent per user information 1460 may include the AC preference level parameter 1470, the preferred AC parameter 1475, MPDU MU spacing factor 1485 and the TID aggregation limit 1480. The AC preference level parameter 1470 may indicate that the TIDs of corresponding signaled AC in the preferred AC parameter 1475 should be preferred over other TIDs when MPDUs are aggregated within the multi-TIF A-MPDU. The preferred AC parameter 1475 may indicate a value of AC recommended (and/or preferred) by the AP 102 from which MPDUs are to be aggregated primarily within a multi-TID A-MPDU. As a non-limiting example, values of 00, 01, 10, and 11 may indicate AC_VO, AC_VI, AC_BE, and AC_BK, respectively. It is understood that the mapping of values is not limiting. It is also understood that the preferred AC parameter may be mapped to a different set of cases, in some embodiments.

An example implementation is presented below. It is understood that operations, guidelines, rules and/or other elements described for the example implementation may not necessarily be included in other implementations. In addition, similar or alternate operations, guidelines, rules and/or other elements may be used in other implementations. For instance, an operation may be described as mandatory (such as through the use of the word "shall") in the example implementation, but other implementations may include the operation as a non-mandatory operation and/or optional operation. In addition, an operation may be described as non-mandatory and/or optional (such as through the use of the word "should") in the example implementation, but other implementations may include the operation as a mandatory operation.

In some cases of the example implementation, the AP 102 may specify a value of an AC in the preferred AC parameter (such as 1425 or 1475) and may specify a value of "1" in the AC preference level parameter (such as 1420 or 1470) in the type dependent common information 410/type dependent per user information 460 of a basic variant TF (such as 1400 or 1450 or other). The STA 103 should or may aggregate one or multiple MPDUs from any one of the TIDs from the corresponding signaled AC when the STA 103 has buffered traffic in this AC. When the STA 103 does not have buffered traffic in the indicted AC, the STA 103 may aggregate MPDUs from any AC/TID or combination of TIDs. The STA 103 may aggregate MPDUs from TIDs in other ACs within the remaining time to the UL PPDU duration value indicated in the Length field of the TF. In this example implementation, the total number of TIDs from which QoS data MPDUs are aggregated by the STA 103 shall not exceed the limit indicated in the TID aggregation limit sub-field of its per user information field in the TF.

In some cases of the example implementation, the AP 102 may specify a value of "0" in the AC preference level parameter (such as 1420 or 1470) in the type dependent common information 410/type dependent per user information 460 of a basic variant TF (such as 1400 or 1450 or other). The STA 103 should or may aggregate one or multiple MPDUs from any AC/TID or combination of TIDs, up to the limit indicated in the TED aggregation limit 1480 in the type dependent per user information 460 of the TF 1450.

It should also be noted that the example TFs 700, 1400, 1450 may include various fields as shown in FIGS. 7 and 14, such as length, cascade indication, HE Sig-A information, CP and LTF type, trigger type and/or others. However, it is understood that, in some embodiments, the TFs 700, 1400, 1450 may not necessarily include all of the fields shown in FIG. 7 or 14 and may even include additional fields in some cases.

Returning to the method 400, at operation 415, the STA 103 may select a group of aggregate TIDs to be used as part of an aggregation of data packets. At operation 420, the STA 103 may generate an A-MPDU that includes MPDUs of the aggregate TIDs. In some embodiments, MPDUs of the group of aggregate TIDs (multiple TIDs) may be aggregated into the A-MPDU, as will be described below. At operation 425, the STA 103 may transmit the A-MPDU to the AP 102. The STA 103 may receive an immediate BA message from the AP 102 at operation 430. The STA 103 may receive a delayed BA message from the AP 102 at operation 435. As will be described below, the delayed BA message may not necessarily be transmitted by the AP 102 in some cases, and therefore some embodiments of the method 400 may not necessarily include operation 435.

The group of aggregate TIDs may be selected in accordance with one or more parameters that may be included in the TF, such as the AC constraint parameter, the TID aggregation limit parameter and/or other parameters (such as system parameters and/or default parameters). Non-limiting examples of such selection techniques will be described below.

In some embodiments, the group of aggregate TIDs may be selected from a group of TIDs that are active at the STA 103. Embodiments are not limited to active TIDs, however. As an example, the group of aggregate TIDs may be selected from a group of TIDs that are supported by the STA 103 (but not necessarily active). As another example, the group of aggregate TIDs may be selected from a group of TIDs that are included in a Quality of Service (QoS) arrangement.

In some embodiments, a number of aggregate TIDs selected may be based on the TID aggregation limit parameter. As a non-limiting example, the TID aggregation limit parameter may indicate a threshold of a number of aggregate TIDs for which MPDUs of the A-MPDU would be acknowledged by the AP 102 as part of an immediate acknowledgement. In some embodiments, the number of aggregate TIDs selected may not necessarily be restricted to values that are less than or equal to the threshold. However, the number of TIDs selected may affect whether the MPDUs are acknowledged, by the AP 102, with an immediate acknowledgement or with a combination of immediate acknowledgement and a delayed acknowledgement.

For instance, when the number of aggregate TIDs selected is less than or equal to the threshold, the MPDUs of those aggregate TIDs may be acknowledged by the immediate acknowledgement. Referring to FIG. 6, the A-MPDU 640 may be transmitted by the STA 620. The immediate BA message 650 may be transmitted by the AP 102 to the STA 103, and may include reception indicators for the MPDUs of the aggregate TIDs. In such cases, the delayed BA message 655 may not be transmitted. In some embodiments, the reception indicators for the MPDUs may indicate whether the MPDUs have been successfully decoded by the AP 102.

However, when the number of aggregate TIDs selected is greater than the threshold, the MPDUs of a first portion of the group of aggregate TIDs may be acknowledged by the immediate acknowledgement and the MPDUs of a second portion of the group of aggregate TIDs may be acknowledged by one or more delayed acknowledgements. As a non-limiting example, a number of aggregate TIDs in the first portion may be equal to the threshold. A number of aggregate TIDs in the second portion may be equal to a difference between the number of aggregate TIDs and the threshold. Referring to FIG. 6, the immediate BA message 650 may be transmitted by the AP 102 to the STA 103, and may include reception indicators for the MPDUs of the first portion of the aggregate TIDs. The delayed BA message 655 may be transmitted by the AP 102 to the STA 103, and may include reception indicators for the MPDUs of the second portion of the aggregate TIDs. The delayed BA message 655 may be transmitted after the immediate BA message 650 in accordance with a delay that may or may not be predetermined. For instance, a next available time slot/window after the immediate BA message 650 may be used for the delayed BA message 655, in some cases. In some embodiments, the reception indicators for the MPDUs may indicate whether the MPDUs have been successfully decoded by the AP 102.

In some embodiments, when the number of aggregate TIDs is less than or equal to the threshold, the STA 103 may receive an immediate BA message from the AP 102 that includes reception indicators for MPDUs of the aggregate TIDs. When the number of aggregate TIDs is greater than the threshold, the STA 103 may receive an immediate BA message from the AP 102 and may receive a delayed BA message from the AP 102. The immediate BA message may include reception indicators for MPDUs of a first portion of the aggregate TIDs. A number of aggregate TIDs of the first portion may be equal to the threshold, in some cases. The delayed BA message may include reception indicators for MPDUs of a second portion of the aggregate TIDs. A number of aggregate TIDs of the second portion may be equal to a number of aggregate TIDs minus the threshold, in some cases.

It should be noted that the immediate BA 650 and/or delayed BA 655 may include one or more reception indicators for MPDUs included in the A-MPDU 640 transmitted to the AP 610 by the STA 620. In some cases, the BA messages 650, 655 may also include reception indicators for MPDUs not necessarily included in the A-MPDU 640, in some cases. For instance, MPDUs from previous A-MPDUs and/or MPDUs not necessarily transmitted in an A-MPDU may be acknowledged by messages such as 650, 655, in some embodiments.

It should also be noted that in some embodiments, the TF may include multiple TID aggregation limit parameters. For instance, a first TID aggregation limit parameter may indicate a number of TIDs that may be selected for immediate acknowledgement and a second aggregation limit parameter may indicate a number of TIDs that may be selected for delayed acknowledgement.

In some embodiments, a number of aggregate TIDs selected and/or a number of ACs from which TIDs are to selected may be based on an AC aggregation limit parameter. As a non-limiting example, the AC aggregation limit parameter may indicate a threshold of a number of ACs for which MPDUs of the A-MPDU would be acknowledged by the AP 102 as part of an immediate acknowledgement. In some embodiments, the AC aggregation limit parameter may be included in the TF instead of the TID aggregation limit parameter. The scope of embodiments is not limited in this respect, however, as the TF may include AC aggregation limit parameter may be included instead of the TID aggregation limit parameter, in some embodiments.

In some embodiments, the TID aggregation limit may refer to a number of data TIDs and/or management TIDs. The management TIDs may not necessarily be mapped to an AC.

It should be noted that embodiments are not limited to usage of a TF that includes the TID aggregation limit parameter and/or AC constraint parameter for an immediate data transmission. In some embodiments, the TID aggregation limit parameter and/or AC constraint parameter indicated in a TF may refer to more than just an immediate data transmission. As an example, aggregation to be used in multiple future uplink transmissions may be indicated by the TF. Embodiments are also not limited to inclusion of these parameters in the TF, as other techniques, such as dedicated control messages, dedicated management messages and/or others, may be used in some embodiments.

Returning to the selection of the aggregate TIDs at operation 415, non-limiting examples of techniques that may be used for the selection in accordance with the TID aggregation limit parameter and/or AC constraint parameter will be given below. However, it is understood that the selection may be performed using other suitable techniques, some of which may also use the TID aggregation limit parameter and/or AC constraint parameter.

In some embodiments, the selection of the aggregate TIDs may be based on the AC constraint parameter. It should be noted that in some embodiments, the selection of the aggregate TIDs may be based on the AC constraint parameter and on the TID aggregation limit parameter. In addition, other parameters may be used, in addition to the AC constraint parameter and the TID aggregation limit parameter, in some embodiments.

In some embodiments, the AC constraint parameter may indicate a recommended AC (and/or preferred AC) of the group from which at least a portion of the aggregate TIDs are to be selected. As a non-limiting example, the TIDs that are mapped to the recommended AC may be selected to the group of aggregate TIDs. Depending on the number of TIDs mapped to the recommended AC and the TID aggregation limit parameter, additional TIDs may be selected to the group of aggregate TIDs. Although embodiments are not limited as such, the STA 103 may select the additional TIDs from ACs of lower QoS priority than the AC class, in some cases. Accordingly, descending QoS priority may be used for the selection of the additional TIDs, in some cases. For instance, one or more TIDs from a next AC (such as the AC of next highest QoS priority) may be selected.

As an example, when two TIDs are mapped to the recommended AC and the TID aggregation limit parameter is three, the STA 103 may select one more TID from the AC of next highest QoS priority. As another example, when two TIDs are mapped to each AC and the TID aggregation limit parameter is five, the STA 103 may select the two TIDs from the recommended AC, the two TIDs from the AC of QoS priority one level below that of the recommended AC, and one more TID from the AC of QoS priority two levels below that of the recommended AC.

As another example, when no TIDs are active and/or supported by the STA 103 for a recommended AC, the STA 103 may select TIDs from ACs of QoS priority less than the recommended AC.

In some embodiments, the AC constraint parameter may also indicate that the selection of the aggregate TIDs is unrestricted by a recommended AC. Accordingly, the STA 103 may select any TIDs of any AC, in such cases.

In some embodiments, the AC constraint parameter may be configurable to indicate the recommended AC. In some embodiments, the AC constraint parameter may be further configurable to indicate that the selection of the aggregate TIDs is unrestricted by a recommended AC. As a non-limiting example, a first value of the AC constraint parameter may indicate that the recommended AC is the voice AC, a second value of the AC constraint parameter may indicate that the recommended AC is the video AC, a third value of the AC constraint parameter may indicate that the recommended AC is the best effort AC, and a fourth value of the AC constraint parameter may indicate that the selection of the aggregate TIDs is unrestricted by a recommended AC. It should be noted that this example may be extended to include additional values for the AC parameter. The additional values may indicate other recommended ACs and/or other information related to ACs/QoS and/or selection of the aggregate TIDs. In addition, embodiments are not limited to the four pieces of information indicated by the four values of the AC constraint parameter in the example.

As another non-limiting example, the AC constraint parameter may include two bits. A value of 00 may indicate that the recommended AC is the voice AC, a value of 01 may indicate that the recommended AC is the video AC, and a value of 10 may indicate that the recommended AC is the best effort AC. In some cases, a value of 11 may indicate that the selection of the aggregate TIDs is unrestricted by a recommended AC. In other cases, a value of 11 may indicate that the recommended AC is the background AC. It should be noted that this example mapping for values of the AC constraint parameter is not limiting. It should also be noted that embodiments are not limited to usage of two bits for the AC constraint parameter, as any suitable number of bits may be used.

Accordingly, the AC constraint parameter may indicate various information related to the ACs and/or QoS that may be used by the STA 103 for selection of the group of aggregate TIDs. In some embodiments, the information indicated by the AC constraint parameter may include any or all of the previously described pieces of information, such as a recommended AC or an indication that the selection of the aggregate TIDs is unrestricted by a recommended AC. Embodiments are not limited to this information, however. In some embodiments, other information related to the ACs, QoS and/or the selection of the group of aggregate TIDs may be indicated by the AC constraint parameter, in addition to or instead of, one or more of the pieces of information previously described for the AC constraint parameter.

In some embodiments, a TID priority may be based on an AC priority. The AC priority may be pre-defined or may be indicated dynamically by the TF. In some cases, such as when a single AC is indicated, the indicated AC may be at a highest priority and all other ACs may be of equal or lower priority. In some cases, an AC may divided into priority groups in which a priority group may include more than one AC.

In some embodiments, an explicit construction policy may be used, in which the STA 103 may receive restrictions from the AP 102 related to aspects such as resource allocation, PPDU construction, a number of TIDs to be aggregated in a PSDU, a number of TIDs aggregated that would be immediately acknowledged, a TID construction policy and/or others. In some embodiments, an implicit construction policy may be used, in which the AP 102 may allocate resources based on a construction restrictions set (which may be reflected at the AP 102) and may signal to the STA 103 (per allocation and/or as a general policy) one or more construction restrictions used in generating the resource allocations. The STA 103 may use this information to construct the PPDU, in some cases.

In some embodiments, synchronization between UL and DL PPDU construction may enable aggregation of multiple MPDUs from multiple TIDs that may consider and/or may be based on factors such as quality of service (QoS), buffer status and other factors of multi-user (MU) connectivity.

It should be noted that in some embodiments, the STA 103 may receive a coordinated transmission allocation for a coordinated entity (such as the AP 102). However, the PPDU construction may also be relevant to cases in which a receiver may need to be synchronized with a transmitter for PPDU construction. It should be noted that in some cases in which implicit construction is used, the STAs 103 may be responsible for the UL QoS by UL PPDU construction.

In some embodiments, an implicit construction may be used in which the STA 103 may signal a set of "construction restrictions" and may be notified of "construction restrictions" to be used by the STA 103 to construct a PPDU based on resource allocation. In some cases, this may assist the AP 102 to adapt and/or optimize a specific STA 103 resource allocation to the STA 103 PPDU construction method. In some embodiments, the signaling may be specific to an STA 103 and/or common for a group of STAs 103. In some embodiments, the signaling may refer to a specific allocation and/or long term multiple allocations. In some embodiments, a resource allocation entity may instruct, indicate and/or recommend to the STA 103 how to construct a specific and/or a long term UL PPDU (sent from and/or to a specific STA 103 and/or group of STAs 103).

In some embodiments, the STA 103 may signal and/or negotiate a set of DL PPDU construction limits and rules with the AP 102 and/or other STA 103 for construction of a PPDU (for example, for DL transmission). The resource allocation entity (such as the AP 102) may consider (implicit) and/or enforce them (explicit) when a DL PPDU is constructed.

In some embodiments, a suggested construction policy may be signaled by a group of one or more Construction Synchronization Parameters (CSP) and/or Construction Synchronization Restrictions (CSR). The CSP and/or CSR may include limitations, priorities and/or guidance, in some embodiments. Examples of such may include, but are not limited to link level aspects (such as durations of PPDUs, TXOPs and/or other), data rates, bandwidths and/or other. The examples may further include, but are not limited to, aggregation parameters, such as a number of MSUU, a number of MSUUs per MPDU/AMSDU, a number of MPUUs, a number of MPUUs per PPDU/AMPDU, a number of TIDs, a number of immediately actable TIDs and/or others. The examples may further include, but are not limited to, QoS parameters, such as TID level restrictions (grant, duration, bandwidth and/or others), AC restrictions (grant, duration, bandwidth and/or others), MPDU type restrictions (MSDU type, such as data, management, control and/or other type). These example parameters are not limiting. In some embodiments, one or more other parameters may also be included. In some embodiments, one or more of the example parameters given above may be used. In some embodiments, one or more of the example parameters given above and one or more additional parameters may be used.

In some embodiments, CSP/CSR priorities, limitations and/or construction guidelines may include, but are not limited to, aggregation priorities, aggregation type priorities (single, dubbed, non), fragmentation priority, amount of padding, acknowledgment priority, aggregation contraction policy and/or QoS Priorities (such as TID level priorities, AC level priorities, PD type priorities and/or others).

In some embodiments, an aggregation contraction policy may include, but is not limited to, one or more of the following aggregation contraction policies. As an example, in an equal aggregation construction policy, each active TID/AC (TID/AC that has data to transmit) may receive equal resources. As another example, in a proportional construction policy, each active TID/AC (TID/AC that has data to transmit) may receive proportional resources based on a pre-defined definition. As another example, in a weighted round robin queue pulling (MSDU based or MPDU based) contraction policy, resources may be allocated to active TIDs/ACs based on pre-defined definition of weighted round robin selection of the queues of the active TIDs. As another example, in accordance with an absolute pre-defined priority, resources may be allocated to the highest priority TID/AC until it is fully served. Resources may then be allocated to other TIDs/ACs based on a pre-defined TID/AC priority. As another example, in accordance with a first come first served priority, resources may be allocate based on an order of arrival of the MSDUs/MPDUs.

In some embodiments, the CSP/CSR may be indicated in a particular frame during a particular time period. As an example, the CSP/CSR may be indicated during a beacon frame and/or other frame during a pre-defined period. As another example, the CSP/CSR may be indicated during a control frame and/or other frame during a specific TXOP period. As another example, the CSP/CSR may be indicated during a TF, control frame and/or other frame for a next PPDU transmission.

In some embodiments, the CSP/CSR may define a specific resource allocation configuration based on one or more parameters, including but not limited to a modulation and coding scheme (MCS), number of spatial streams (NSS), bandwidth/RU set, transmit power, operation mode, transmission type, PHY mode and/or other parameters. In some embodiments, the CSP/CSR may define a specific acknowledgment configuration/state, including but not limited to an acknowledgment mode (MU-STA, MU-TID, BA, ACK and/or other), an acknowledgment type (imitate, delayed and/or other) and/or other acknowledgment parameters. In some embodiments, in an association/TS establishment, a specific set of CSP/CSR may be negotiated (by defining a value or an operating condition of DL/UL MU transmission parameters) during association, modification and/or other type of indication (such as a change in link condition). In some embodiments, in an association/TS establishment, a specific set of CSP/CSR may be advertised. For example, a beacon may be used.

In some embodiments, a method synchronized at the AP 102 side may be used. When an STA 103 buffer request exceeds the "available resources" and/or the STA 103 has request for more than a TID limit, the AP 102 may assist the STA 103 in implicit construction or may guide the STA 103. The AP 102 may notify the STA 103 of a resource allocation policy to be used to create the STA 103 allocation. As an example, the allocation may be done based on the flowing TIDs Priority. Allocation TID partition guidelines may include a first option (Option A) in which the allocation is performed assuming that the STA 103 aggregates equal proportion of MPDUs/MSDUs from each TID. Allocation TID partition guidelines may include a second option (Option A) in which the allocation is performed assuming that the STA 103 aggregates weighted proportions of MPDUs/MSDUs from each TID.

In some embodiments, a method synchronized at the STA 103 side may be used. As an example, when the STA 103 has buffered MPDUs/MSDUs from a number of TIDs that exceeds a restriction of the number of TIDs and/or when a number of buffered MPDUs/MSDUs exceeds an allocation size (for example, a pre-defined UL PPDU duration), the STA 103 may implement one of the following TID aggregation methodologies: equal TID aggregation, proportional TID aggregation, weighted round robin TID aggregation, priority-based TID aggregation, first come first serve TID aggregation and/or other aggregation techniques. These techniques will be described below.

FIGS. 8-12 illustrate examples of aggregation of packets in accordance with some embodiments. It should be noted that the examples shown in FIGS. 8-12 may illustrate some or all of the concepts and techniques described herein in some cases, but embodiments are not limited by the examples. For instance, embodiments are not limited by the name, number, type, size, ordering, arrangement and/or other aspects of the ACs, TIDs, A-MPDUs, MPDUs, MSDUs, frames, signals, data blocks, control headers and other elements as shown in FIGS. 8-12. Although some of the elements shown in the examples of FIGS. 8-12 may be included in an 802.11 standard and/or other standard, embodiments are not limited to usage of such elements that are included in standards.

It should be noted that the MPDUs in the examples of FIGS. 8-12 may be labeled in terms of an AC (such as VO, VI, BE or BK) and an index that may be a time index related to an order of arrival at a FIFO (the buffers of the TIDs). Time indexes of 01-17 may be assigned to the MPDUs in the examples of FIGS. 8-12 based on order of arrival. For instance, the MPDU labelled as VO(07) may be a voice MPDU that arrives seventh chronologically, and the MPDU labelled as VI(05) may be a video MPDU that arrives fifth chronologically.

Figure 8:
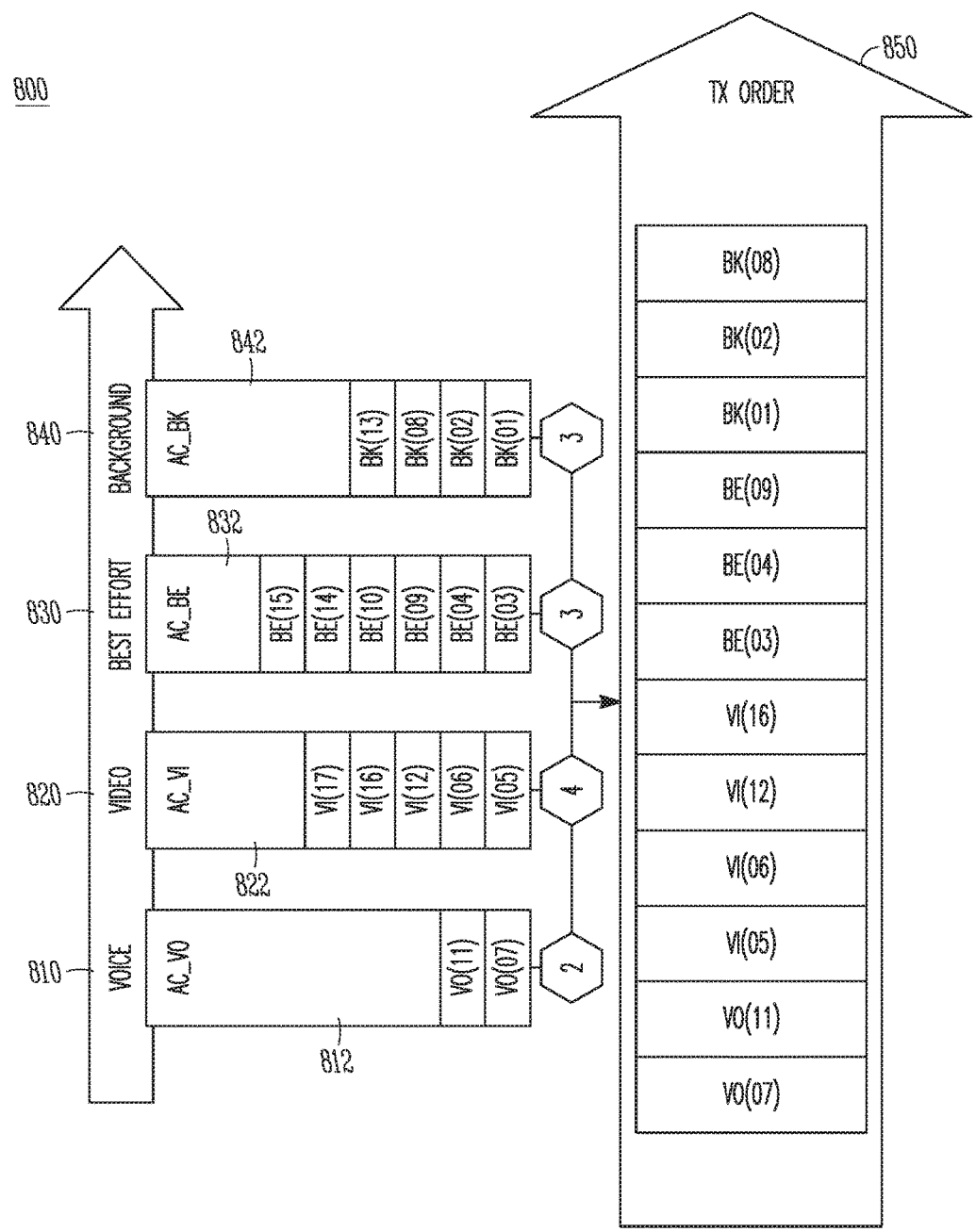
FIG. 8 illustrates an example of aggregation of packets in accordance with some embodiments.

Referring to FIG. 8, an example of an equal TID aggregation is illustrated. The TIDs 810, 820, 830, and 840 (which may be the group of aggregate TIDs in this example) are mapped to voice, video, best effort and background ACs, respectively. As shown, MPDUs/MSDUs 812, 822, 832, 842 are buffered for those TIDs. The A-MPDU 850 may include an equal number of MPDUs/MSDUs from the buffers 812, 822, 832, 842 in some cases. In the example shown, three MPDUs from 822, 832, and 842 are included in the A-MPDU 850. Only two MPDUs are included from 812, as only two are buffered. In a case in which three or more MPDUs were buffered in 812, three of those MPDUs may be included in the A-MPDU 850. It should be noted that embodiments are not limited to the inclusion of three MPDUs, as any suitable number of MPDUs per TID may be used in some cases. In addition, in this example, as only two MPDUs are available in the buffer 812 and three MPDUs are included from 822, 832, and 842, it may be possible that an extra MPDU from 822 is also included. For instance, to make up for the fact that three MPDUs are to be selected from 812 but only two MPDUs are available in the buffer 812, an extra MPDU from another buffer (such as 822) may be aggregated instead. Accordingly, four MPDUs from 822 may be used in some cases.

Figure 9:
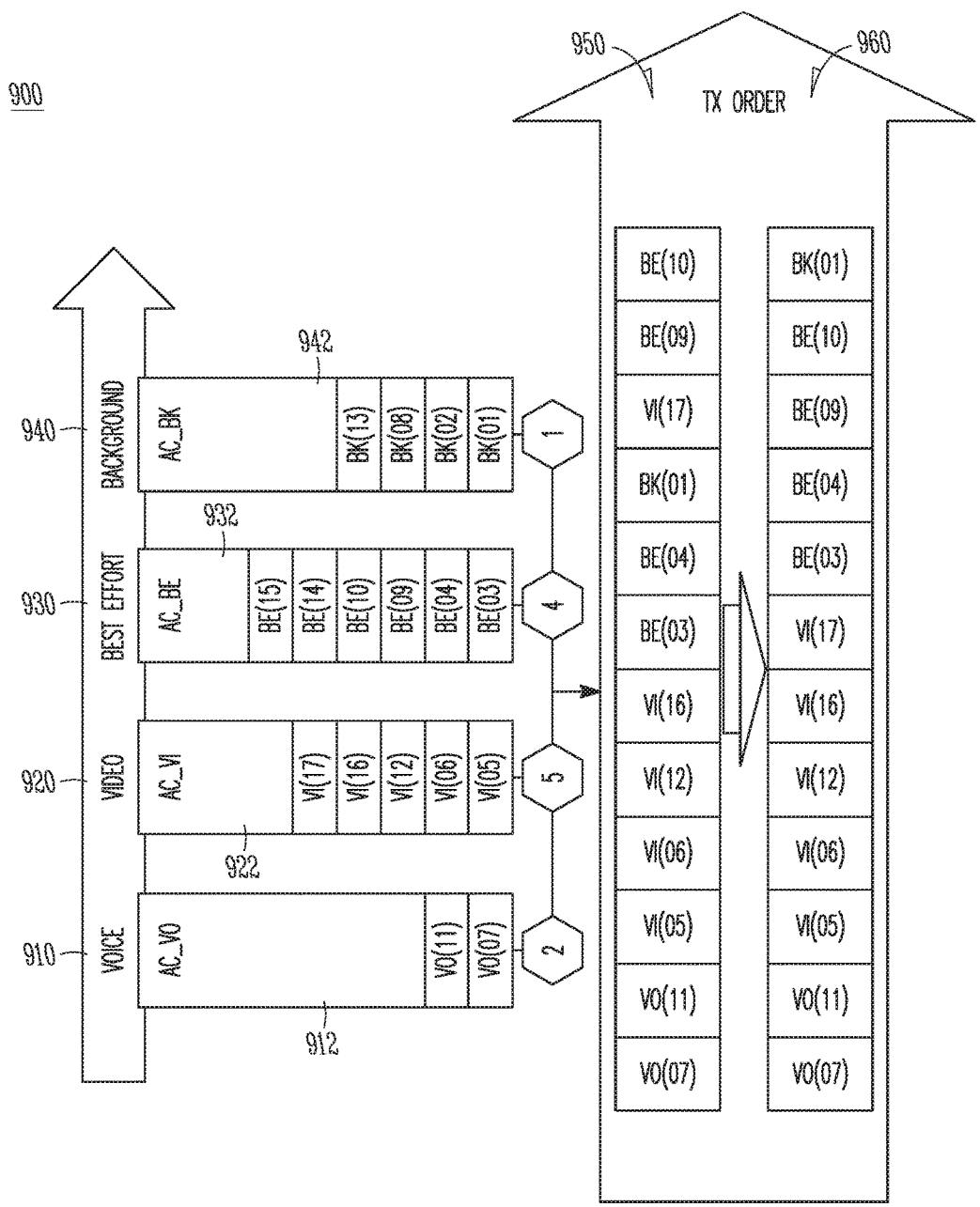
FIG. 9 illustrates another example of aggregation of packets in accordance with some embodiments.

In some embodiments, the MPDUs of the aggregate TIDs may be aggregated into the A-MPDU in accordance with a proportional TID aggregation in which numbers of MPDUs from the aggregate TIDs are based on a group of predetermined ratios for the aggregate TIDs. Referring to FIG. 9, the TIDs 910, 920, 930, and 940 (which may be the group of aggregate TIDs in this example) are mapped to voice, video, best effort and background ACs, respectively. As shown, MPDUs/MSDUs 912, 922, 932, 942 are buffered for those TIDs. A proportional weighting of 8 voice, 4 video, 2 best effort and 1 background may be used. Accordingly, a first portion of the A-MPDU 950 includes the 2 voice MPDUs VO(07) and VO(11) (which may be up to 8 if more than 2 are available). The first portion of the A-MPDU 950 also includes 4 video MPDUs VI(05), VI(06), VI(12) and VI(16). The first portion of the A-MPDU 950 also includes 2 best effort MPDUs BE(03) and BE(04). The first portion of the A-MPDU 950 also includes one background MPDU BK(01). It should be noted that the MPDUs of the first portion are aggregated in accordance with the 8-4-2-1 ratio described above. It is understood that as many voice MPDUs up to 8 that are available (2 in this case) are aggregated. Continuing the example, a second portion may be aggregated in accordance with the 8-4-2-1 ratio. However, in this example, zero voice MPDUs and only one video MPDU VI(17) are available. Accordingly, the second portion includes VI(17), BE(09), and BE(10). The A-MPDU 950 may be transmitted to the AP 102, in some cases. However, the A-MPDU 950 may be reordered to the A-MPDU 960, which includes the same MPDUs of A-MPDU 950 reordered to include MPDUs of a same AC in sequence. The A-MPDU 960 may be transmitted to the AP 102, in some cases. It should be noted that embodiments are not limited to the weighting of 8-4-2-1, as any suitable weighting may be used.

Figure 10:
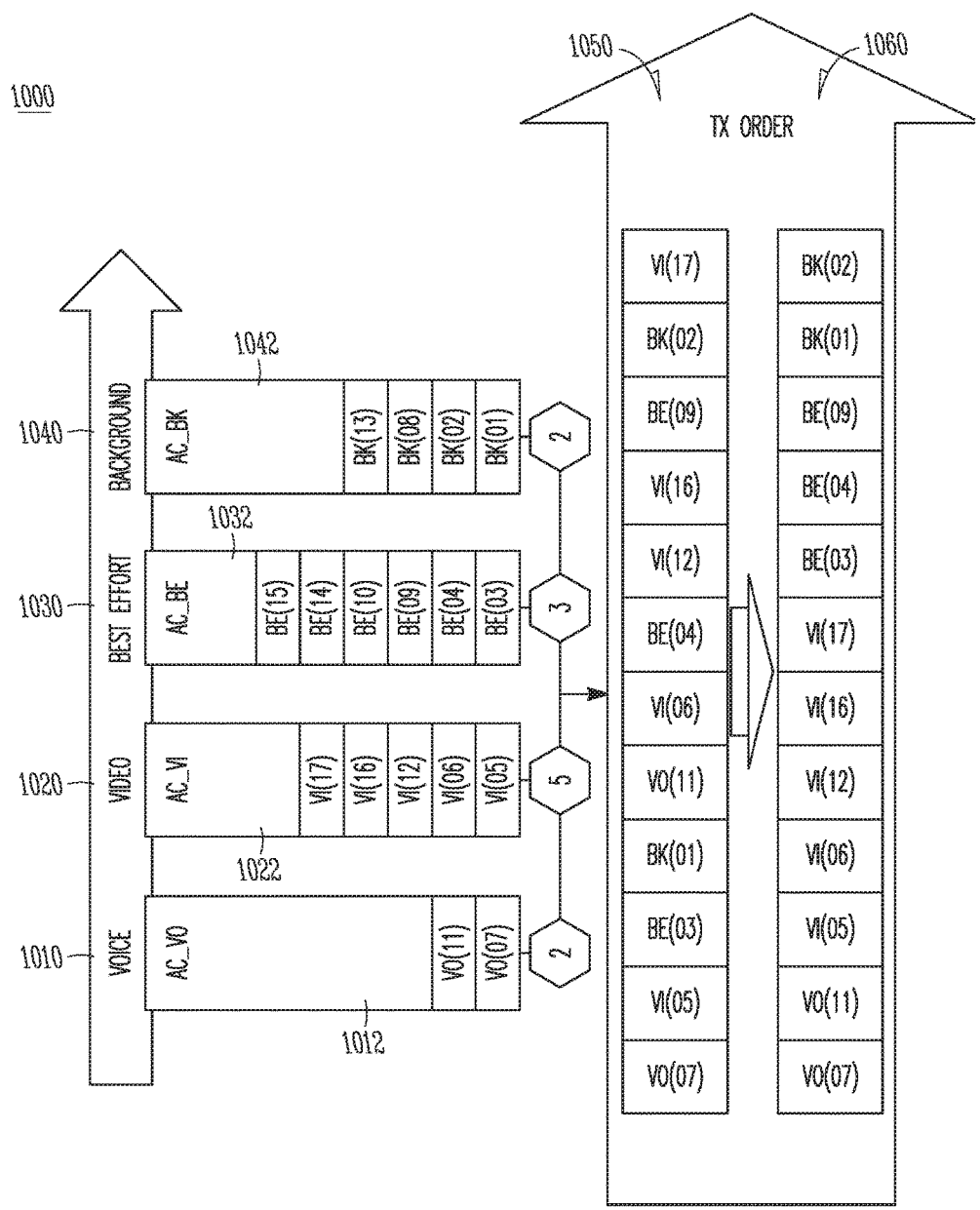
FIG. 10 illustrates another example of aggregation of packets in accordance with some embodiments.

In some embodiments, the MPDUs of the aggregate TIDs may be aggregated into the A-MPDU in accordance with a weighted round robin aggregation. Referring to FIG. 10, the TIDs 1010, 1020, 1030, and 1040 (which may be the group of aggregate TIDs in this example) are mapped to voice, video, best effort and background ACs, respectively. As shown, MPDUs/MSDUs 1012, 1022, 1032, 1042 are buffered for those TIDs. A weighting of 8 voice, 4 video, 2 best effort and 1 background may be used. The A-MPDU 1050 may be transmitted to the AP 102, in some cases. However, the A-MPDU 1050 may be reordered to the A-MPDU 1060, which includes the same MPDUs of A-MPDU 1050 reordered to include MPDUs of a same AC in sequence. The A-MPDU 1060 may be transmitted to the AP 102, in some cases.

Figure 11:
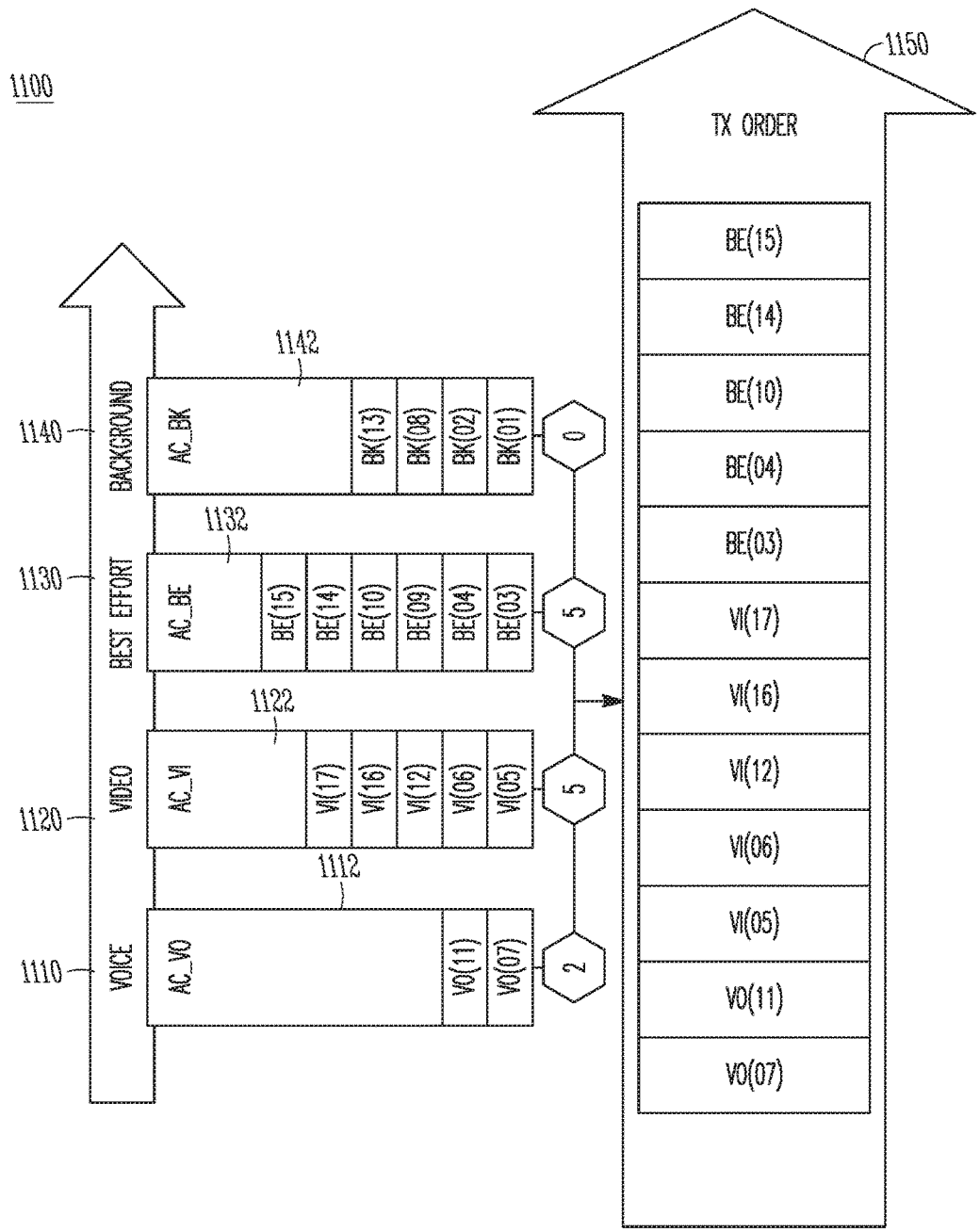
FIG. 11 illustrates another example of aggregation of packets in accordance with some embodiments.

In some embodiments, the MPDUs of the aggregate TIDs may be aggregated into the A-MPDU in accordance with a priority based TID aggregation in which the aggregation may be performed sequentially with respect to the aggregate TIDs in accordance with descending QoS priorities of the ACs of the aggregate TIDs. Referring to FIG. 11, the TIDs 1110, 1120, 1130, and 1140 (which may be the group of aggregate TIDs in this example) are mapped to voice, video, best effort and background ACs, respectively. As shown, MPDUs/MSDUs 1112, 1122, 1132, 1142 are buffered for those TIDs. The MPDUs 1112 of the first TID 1110 may be aggregated into the A-MPDU 1150 until exhaustion of the first TID 1110. If the A-MPDU 1150 still has capacity to accept more MPDUs, the MPDUs 1122 of the second TID 1120 may be aggregated until exhaustion of the second TID 1120. This technique of aggregating MPDUs of descending AC priority may be extended (such as to the third TID 1130 and perhaps the fourth TID) until the A-MPDU 1150 no longer has capacity to accept more MPDUs or until the buffered MPDUs of all the TIDs are aggregated into the A-MPDU 1150. The A-MPDU 1150 may be transmitted to the AP 102, in some cases.

Figure 12:
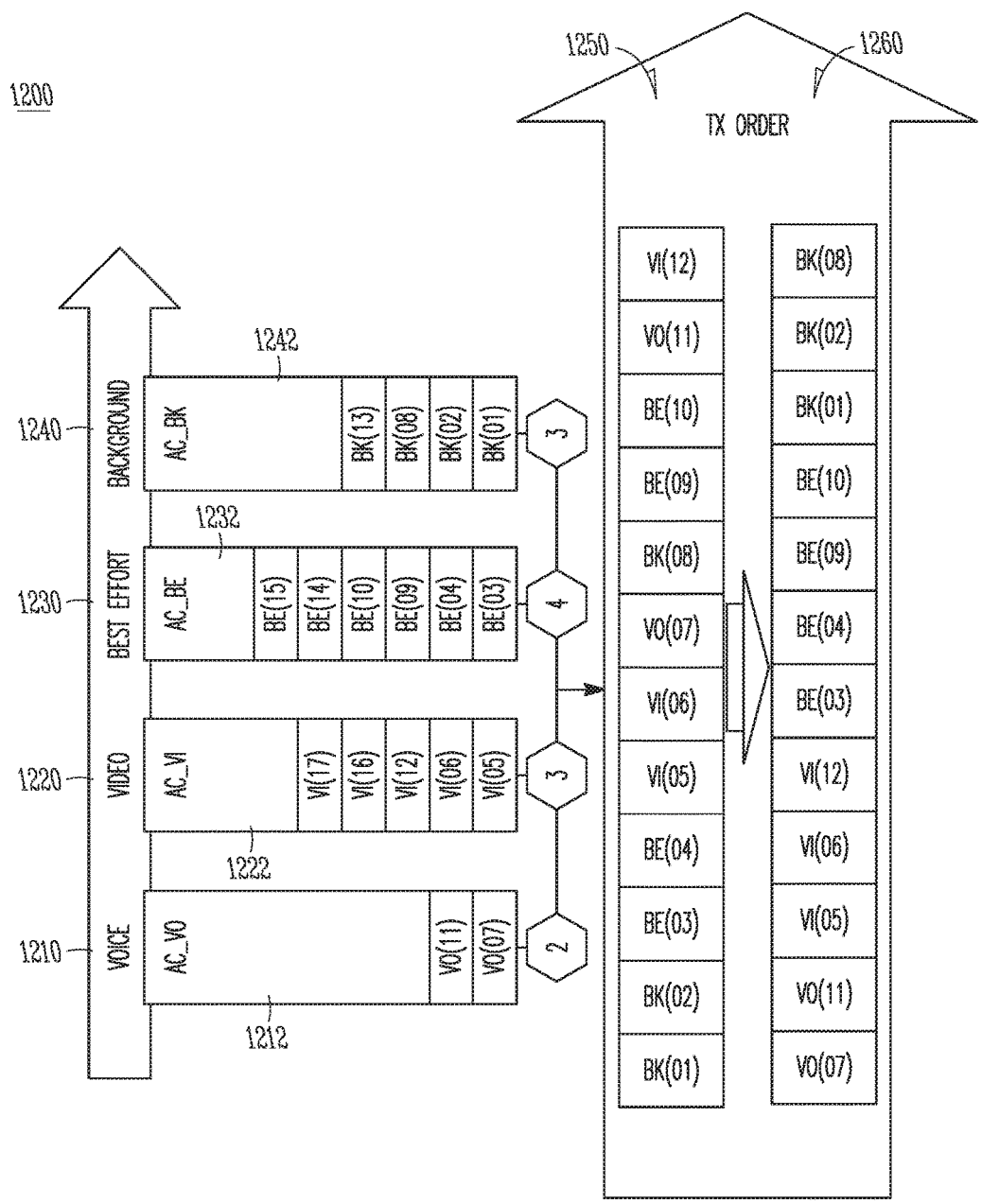
FIG. 12 illustrates another example of aggregation of packets in accordance with some embodiments.

In some embodiments, the MPDUs of the aggregate TIDs may be aggregated into the A-MPDU in accordance with a chronological aggregation based on time indexes of the MPDUs of the aggregate TIDs. For instance, a first come first serve technique in which the MPDUs are aggregated into the A-MPDU based on order of arrival into the FIFO queue (the buffers of the TIDs). Referring to FIG. 12, the TIDs 1210, 1220, 1230, and 1240 (which may be the group of aggregate TIDs in this example) are mapped to voice, video, best effort and background ACs, respectively. As shown, MPDUs/MSDUs 1212, 1222, 1232, 1242 are buffered for those TIDs. The MPDUs of time indexes 01-12 may be aggregated into the A-MPDU 1250. The A-MPDU 1250 may be transmitted to the AP 102, in some cases. However, the A-MPDU 1250 may be reordered to the A-MPDU 1260, which includes the same MPDUs of A-MPDU 1250 reordered to include MPDUs of a same AC in sequence. The A-MPDU 1260 may be transmitted to the AP 102, in some cases.

It should be noted that embodiments are not limited to the examples of MPDU aggregation described herein, such as those of FIGS. 8-12 and/or others. Other techniques may be used to aggregate MPDUs of TIDs of the group of aggregate TIDs, in some embodiments.

In some embodiments, the AC constraint sub-field of the TF may indicate the value of AC recommended by the AP 102. Values in the range of 00 to 10 may indicate a specific AC. A value of 11 may indicate any TID. In some embodiments, the value in the TID aggregation limit sub-field may indicate a number of TIDs from which MPDUs/MSDUs aggregated are to be immediately acknowledged. As an example, implicit construction rules/guidelines for aggregating multiple TIDs for STAs may be used. For instance, if the AP 102 specifies a value between 00-10 in the AC constraint sub-field in the common information field of the TF: a) if the TID Aggregation Limit sub-field indicates 2 TIDs for the aggregation, the STA 103 aggregates MSDUs from TIDs specific to the signaled AC, and b) if the TID Aggregation Limit sub-field indicates more than 2 TIDs for the aggregation, STA aggregates TIDs from the signaled AC with highest priority along with other TIDs. If the AP specifies a value of 11 in the AC constraint sub-field in the common information field of the TF, the STA 103 may aggregate any TID or combination of TIDs.

In some embodiments, the signaling of multi-TID aggregation information (such as a policy) may be performed using the HE Control field. Referring to FIG. 7, an example of a common info field 750 for Multi-TID Aggregation Recommendation that may be sent by the AP 102 to multiple STAs 103 is shown. As an example, the control ID sub-field 760 may indicate TID priority recommendation per STA. Values of 000 to 110 may indicate ACs in order or priority. The value 111 may be reserved for lowest priority TID or for "any or all TIDs." For instance, 000 may indicate an equal TID aggregation, 001 may indicate a proportional TID aggregation, 010 may indicate a weighted round robin TID aggregation (an optional sub-field may indicate the Weighted per TID), 011 may indicate a priority-based TID aggregation (an optional sub-field may indicate the Priority), and 100 may indicate a first come first serve TID aggregation.

Figure 13:
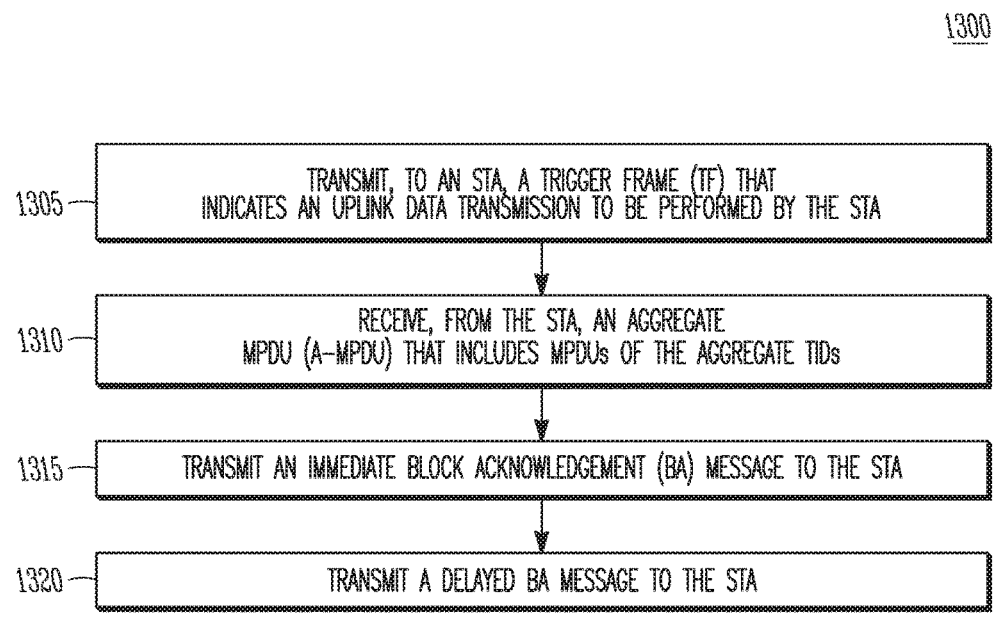
FIG. 13 illustrates the operation of another method of communication in accordance with some embodiments.

FIG. 13 illustrates the operation of another method of communication in accordance with some embodiments. As mentioned previously regarding the method 400, embodiments of the method 1300 may include additional or even fewer operations or processes in comparison to what is illustrated in FIG. 13 and embodiments of the method 1300 are not necessarily limited to the chronological order that is shown in FIG. 13. In describing the method 1300, reference may be made to FIGS. 1-12, although it is understood that the method 1300 may be practiced with any other suitable systems, interfaces and components. In addition, embodiments of the method 1300 may be applicable to APs 102, STAs 103, UEs, eNBs or other wireless or mobile devices. The method 1300 may also be applicable to an apparatus for an AP 102, STA 103 and/or other device described above.

It should be noted that the method 1300 may be practiced by an AP 102 and may include exchanging of elements, such as frames, signals, messages and/or other elements, with an STA 103. Similarly, the method 400 may be practiced at an STA 103 and may include exchanging of such elements with an AP 102. In some cases, operations and techniques described as part of the method 400 may be relevant to the method 1300. In addition, embodiments of the method 1300 may include operations performed at the AP 102 that are reciprocal to or similar to other operations described herein performed at the STA 103. For instance, an operation of the method 1300 may include reception of a frame from the STA 103 by the AP 102 while an operation of the method 400 may include transmission of the same frame or similar frame by the STA 103.

In addition, previous discussion of various techniques and concepts may be applicable to the method 1300 in some cases, including MPDUs, A-MPDUs, TIDs, ACs, QoS, AC constraint parameter, preferred AC parameter, AC preference level parameter, TID aggregation limit parameter, prioritization, acknowledgements, BA messages, delayed BA messages, immediate BA messages and/or others. In addition, the examples shown in FIGS. 5-12 may also be applicable, in some cases, although the scope of embodiments is not limited in this respect.

At operation 1305, the AP 102 may transmit, to the STA 103, a TF that indicates an uplink data transmission to be performed by the STA 103. In some embodiments, the TF may be transmitted to multiple STAs 103 and may indicate that multiple STAs 103 are to perform uplink data transmissions. Accordingly, the TF may be a uni-cast TF, multi-cast TF or broadcast TF, in some embodiments. As previously described, the TF may include parameters including the TID aggregation limit parameter, AC constraint parameter and/or other parameters.

At operation 1310, the AP 102 may receive, from the STA 103, an A-MPDU that includes MPDUs of a group of aggregate TIDs selected by the STA 103. As previously described, the TID aggregation limit parameter, AC constraint parameter may be transmitted by the AP 102 to indicate how the STA 103 may select TIDs for aggregation of MPDUs into A-MPDUs.

At operation 1315, the AP 102 may transmit an immediate BA message to the STA 103 to acknowledge whether or not one or more of the MPDUs of the A-MPDU are successfully received. At operation 1320, the AP 102 may transmit a delayed BA message to the STA 103 to acknowledge whether or not one or more of the MPDUs of the A-MPDU are successfully received. As previously described (and as will be described below), the delayed BA message may not necessarily be transmitted by the AP 102 in some cases, and therefore some embodiments of the method 1300 may not necessarily include operation 1320.

In some embodiments, when the number of aggregate TIDs is less than or equal to the threshold, the AP 102 may transmit an immediate BA message to the STA 103 that includes reception indicators for MPDUs of the aggregate TIDs. When the number of aggregate TIDs is less than or equal to the threshold, the AP 102 may transmit an immediate BA message to the STA 103 and may transmit a delayed BA message to the STA 103. The immediate BA message may include reception indicators for MPDUs of a first portion of the aggregate TIDs. A number of aggregate TIDs of the first portion may be equal to the threshold, in some cases. The delayed BA message may include reception indicators for MPDUs of a second portion of the aggregate TIDs. A number of aggregate TIDs of the second portion may be equal to a number of aggregate TIDs minus the threshold, in some cases.

In Example 1, an apparatus for a station (STA) may comprise memory. The apparatus may further comprise processing circuitry. The processing circuitry may be configured to decode a trigger frame (TF) from an access point (AP). The processing circuitry may be further configured to select a group of aggregate traffic identifiers (TIDs) from a group of candidate TIDs. Medium access control (MAC) protocol data units (MPDUs) buffered at the STA may be mapped to the candidate TIDs based on traffic types of the MPDUs. The processing circuitry may further configured to encode, for transmission to the AP, an aggregated MPDU (A-MPDU) that includes MPDUs of the aggregate TIDs. A number of aggregate TIDs selected may be based on a TID aggregation limit parameter included in the TF. The candidate TIDs may be mapped to a group of access classes (ACs) of a quality of service (QoS) prioritization. The selection of the aggregate TIDs may be further based on a preferred AC parameter included in the TF. The preferred AC parameter may be configurable to indicate a preferred AC of the group of ACs from which at least a portion of the aggregate TIDs are to be selected.

In Example 2, the subject matter of Example 1, wherein the group of ACs may include a voice AC of a highest QoS priority, a video AC of a second highest QoS priority, a best effort AC of a third highest QoS priority, and a background AC of a lowest QoS priority. A first value of the preferred AC parameter may indicate that the preferred AC is the voice AC. A second value of the preferred AC parameter may indicate that the preferred AC is the video AC. A third value of the preferred AC parameter may indicate that the preferred AC is the best effort AC.

In Example 3, the subject matter of one or any combination of Examples 1-2, wherein a fourth value of the preferred AC parameter may indicate that the selection of the aggregate TIDs is unrestricted by the ACs of the candidate TIDs.

In Example 4, the subject matter of one or any combination of Examples 1-3, wherein a fourth value of the preferred AC parameter may indicate that the preferred AC is the background AC.

In Example 5, the subject matter of one or any combination of Examples 1-4, wherein the TID aggregation limit parameter and the preferred AC parameter may be included in a common information field of the TF.

In Example 6, the subject matter of one or any combination of Examples 1-5, wherein the TF may further include an AC preference level parameter. A first value of the preferred AC preference level parameter may indicate that the TIDs of the preferred AC are to be prioritized over other candidate TIDs for the selection of the group of aggregate TIDs. A second value of the preferred AC preference level parameter may indicate that the selection of the aggregate TIDs is unrestricted by the ACs of the candidate TIDs.

In Example 7, the subject matter of one or any combination of Examples 1-6, wherein the TID aggregation limit parameter, the preferred AC parameter, and the AC preference level parameter may be included in a type dependent per user information field of the TF.

In Example 8, the subject matter of one or any combination of Examples 1-7, wherein when the preferred AC parameter indicates the preferred AC: a) when one or more candidate TIDs are mapped to the preferred AC, the selected group of aggregate TIDs may include the one or more candidate TIDs mapped to the preferred AC, and b) when a number of candidate TIDs mapped to the preferred AC is less than a number of aggregate TIDs indicated by the TID aggregation limit parameter, additional aggregate TIDs may be optionally selected from the ACs of lower QoS priority in accordance with the QoS priorities of the group of ACs.

In Example 9, the subject matter of one or any combination of Examples 1-8, wherein the TID aggregation limit parameter may indicate a threshold of a number of aggregate TIDs for which MPDUs of the A-MPDU would be acknowledged by the AP as part of an immediate acknowledgement.

In Example 10, the subject matter of one or any combination of Examples 1-9, wherein the processing circuitry may be further configured to, when the number of aggregate TIDs is less than or equal to the threshold, decode an immediate block acknowledgement (BA) message from the AP that includes a reception indication for MPDUs of the aggregate TIDs.

In Example 11, the subject matter of one or any combination of Examples 1-10, wherein the MPDUs of the aggregate TIDs may be aggregated into the A-MPDU in accordance with a proportional TID aggregation, a priority based TID aggregation or a chronological aggregation. For the proportional TID aggregation, numbers of MPDUs from the aggregate TIDs may be based on a group of predetermined ratios for the aggregate TIDs. For the priority based TID aggregation, the aggregation may be performed sequentially with respect to the aggregate TIDs in accordance with descending QoS priorities of the ACs of the aggregate TIDs. For the chronological aggregation, the MPDUs may be aggregated based on time indexes of the MPDUs of the aggregate TIDs.

In Example 12, the subject matter of one or any combination of Examples 1-11, wherein the STA may be arranged to operate in accordance with a wireless local area network (WLAN) protocol.

In Example 13, the subject matter of one or any combination of Examples 1-12, wherein the processing circuitry may include a baseband processor to decode the TF and to encode the A-MPDU.

In Example 14, the subject matter of one or any combination of Examples 1-13, wherein the apparatus further may include a transceiver to receive the TF and to transmit the A-MPDU.

In Example 15, a non-transitory computer-readable storage medium may store instructions for execution by one or more processors to perform operations for communication by a station (STA). The operations may configure the one or more processors to buffer medium access control (MAC) protocol data units (MPDUs) for an uplink communication to an access point (AP), wherein the MPDUs are mapped to a master group of traffic identifiers (TIDs) based on traffic types of the MPDUs. The operations may further configure the one or more processors to decode a trigger frame (TF) from the AP. The TF may include a TID aggregation limit parameter. The operations may further configure the one or more processors to select a group of aggregate TIDs from the master group of TIDs for aggregation of the buffered MPDUs into an aggregate MPDU (A-MPDU). A number of aggregate TIDs in the group may be selected based on an immediate acknowledgement threshold, indicated by the TID aggregation limit parameter, for which the MPDUs of the aggregate TIDs that are included in the A-MPDU would be acknowledged, by the AP, as part of an immediate acknowledgement.

In Example 16, the subject matter of Example 15, wherein the TIDs of the master group may be mapped to a group of access classes (ACs) of a quality of service (QoS) prioritization. The TF may further include a preferred AC parameter that is configurable to indicate a preferred AC of the group of ACs. The aggregate TIDs may be selected from the TIDs that are mapped to the ACs that are of equal or lower QoS priority than the preferred AC.

In Example 17, the subject matter of one or any combination of Examples 15-16, wherein the TF may further include a preferred AC preference level parameter that indicates whether the TIDs of the preferred AC are to be prioritized over other TIDs of the master group for the selection of the group of aggregate TIDs.

In Example 18, a method of communication by a station (STA) may comprise decoding a trigger frame (TF) from an access point (AP). The method may further comprise selecting a group of aggregate traffic identifiers (TIDs) from a group of TIDs that are active at the STA, wherein medium access control (MAC) protocol data units (MPDUs) buffered at the STA are mapped to the active TIDs based on traffic types of the MPDUs. The method may further comprise encoding, for transmission to the AP, an aggregated MPDU (A-MPDU) that includes MPDUs of the aggregate TIDs. A number of aggregate TIDs selected may be based on a TID aggregation limit parameter of the TF. The active TIDs may be mapped to a group of access classes (ACs) of a quality of service (QoS) prioritization. The selection of the aggregate TIDs may be further based on a preferred AC parameter of the TF that is configurable to indicate a preferred AC of the group from which at least a portion of the aggregate TIDs are to be selected.

In Example 19, the subject matter of Example 18, wherein the group of ACs may include a voice AC of a highest QoS priority, a video AC of a second highest QoS priority, a best effort AC of a third highest QoS priority, and a background AC of a lowest QoS priority. A first value of the preferred AC parameter may indicate that the preferred AC is the voice AC. A second value of the preferred AC parameter may indicate that the preferred AC is the video AC. A third value of the preferred AC parameter may indicate that the preferred AC is the best effort AC.

In Example 20, an apparatus for an access point (AP) may comprise memory. The apparatus may further comprise processing circuitry. The processing circuitry may be configured to encode a trigger frame (TF) for transmission to a station (STA). The processing circuitry may be further configured to decode an aggregated medium access control (MAC) protocol data unit (A-MPDU) from the STA that includes MAC protocol data units (MPDUs). The MPDUs may be mapped to a group of traffic identifiers (TIDs) based on traffic types of the MPDUs and the TIDs are mapped to a group of access classes (ACs) of a quality of service (QoS) prioritization. The TF may include a TID aggregation limit parameter that indicates a threshold of TIDs for the MPDUs of the A-MPDU for which the MPDUs would be acknowledged in an immediate block acknowledgement (BA) message. The TF may further include a preferred AC parameter that is configurable to indicate a preferred AC for which MPDUs of TIDs mapped to ACs of QoS priority equal to or lower than the preferred AC are to be aggregated into the A-MPDU.

In Example 21, the subject matter of Example 20, wherein the group of ACs may include a voice AC of a highest QoS priority, a video AC of a second highest QoS priority, a best effort AC of a third highest QoS priority, and a background AC of a lowest QoS priority. A first value of the preferred AC parameter may indicate that the preferred AC is the voice AC. A second value of the preferred AC parameter may indicate that the preferred AC is the video AC. A third value of the preferred AC parameter indicates that the preferred AC is the best effort AC.

In Example 22, the subject matter of one or any combination of Examples 20-21, wherein the TF may further include an AC preference level parameter that indicates whether the MPDUs of the TIDs of the preferred AC are to be prioritized over other MPDUs of other TIDs for the aggregation of the MPDUs into the A-MPDU.

In Example 23, the subject matter of one or any combination of Examples 20-22, wherein the TID aggregation limit parameter, the preferred AC parameter, and the AC preference level parameter may be included in a type dependent per user information field of the TF.

In Example 24, the subject matter of one or any combination of Examples 20-23, wherein the AP may be arranged to operate in accordance with a wireless local area network (WLAN) protocol.

In Example 25, the subject matter of one or any combination of Examples 20-24, wherein the processing circuitry may include a baseband processor to encode the TF and to decode the A-MPDU.

In Example 26, the subject matter of one or any combination of Examples 20-25, wherein the apparatus may further include a transceiver to transmit the TF and to receive the A-MPDU.

In Example 27, an apparatus for a station (STA) may comprise means for buffering medium access control (MAC) protocol data units (MPDUs) for an uplink communication to an access point (AP), wherein the MPDUs are mapped to a master group of traffic identifiers (TIDs) based on traffic types of the MPDUs. The apparatus may further comprise means for decoding a trigger frame (TF) from the AP. The TF may include a TID aggregation limit parameter. The apparatus may further comprise means for selecting a group of aggregate TIDs from the master group of TIDs for aggregation of the buffered MPDUs into an aggregate MPDU (A-MPDU). A number of aggregate TIDs in the group may be selected based on an immediate acknowledgement threshold, indicated by the TID aggregation limit parameter, for which the MPDUs of the aggregate TIDs that are included in the A-MPDU would be acknowledged, by the AP, as part of an immediate acknowledgement.

In Example 28, the subject matter of Example 27, wherein the TIDs of the master group may be mapped to a group of access classes (ACs) of a quality of service (QoS) prioritization. The TF may further include a preferred AC parameter that is configurable to indicate a preferred AC of the group of ACs. The aggregate TIDs may be selected from the TIDs that are mapped to the ACs that are of equal or lower QoS priority than the preferred AC.

In Example 29, the subject matter of one or any combination of Examples 27-28, wherein the TF may further include a preferred AC preference level parameter that indicates whether the TIDs of the preferred AC are to be prioritized over other TIDs of the master group for the selection of the group of aggregate TIDs.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a station (STA), the apparatus comprising memory; and processing circuitry, configured to:
decode a trigger frame (TF) from an access point (AP);
select a group of aggregate traffic identifiers (TIDs) from a group of candidate TIDs, wherein medium access control (MAC) protocol data units (MPDUs) buffered at the STA are mapped to the candidate TIDs based on traffic types of the MPDUs;
encode, for transmission to the AP, an aggregated MPDU (A-MPDU) that includes MPDUs of the aggregate TIDs,
wherein a number of aggregate TIDs selected is based on a TID aggregation limit parameter included in the TF,
wherein the candidate TIDs are mapped to a group of access classes (ACs) of a quality of service (QoS) prioritization, and
wherein the selection of the aggregate TIDs is further based on a preferred AC parameter included in the TF, the preferred AC parameter configurable to indicate a preferred AC of the group of ACs from which at least a portion of the aggregate TIDs are to be selected.

2. The apparatus according to claim 1, wherein:
the group of ACs includes a voice AC of a highest QoS priority, a video AC of a second highest QoS priority, a best effort AC of a third highest QoS priority, and a background AC of a lowest QoS priority,
a first value of the preferred AC parameter indicates that the preferred AC is the voice AC,
a second value of the preferred AC parameter indicates that the preferred AC is the video AC, and
a third value of the preferred AC parameter indicates that the preferred AC is the best effort AC.

3. The apparatus according to claim 2, wherein a fourth value of the preferred AC parameter indicates that the selection of the aggregate TIDs is unrestricted by the ACs of the candidate TIDs.

4. The apparatus according to claim 2, wherein a fourth value of the preferred AC parameter indicates that the preferred AC is the background AC.

5. The apparatus according to claim 1, wherein the TID aggregation limit parameter and the preferred AC parameter are included in a common information field of the TF.

6. The apparatus according to claim 1, wherein:
the TF further includes an AC preference level parameter,
a first value of the preferred AC preference level parameter indicates that the TIDs of the preferred AC are to be prioritized over other candidate TIDs for the selection of the group of aggregate TIDs, and
a second value of the preferred AC preference level parameter indicates that the selection of the aggregate TIDs is unrestricted by the ACs of the candidate TIDs.

7. The apparatus according to claim 6, wherein the TID aggregation limit parameter, the preferred AC parameter, and the AC preference level parameter are included in a type dependent per user information field of the TF.

8. The apparatus according to claim 1, wherein when the preferred AC parameter indicates the preferred AC:
when one or more candidate TIDs are mapped to the preferred AC, the selected group of aggregate TIDs includes the one or more candidate TIDs mapped to the preferred AC, and
when a number of candidate TIDs mapped to the preferred AC is less than a number of aggregate TIDs indicated by the TID aggregation limit parameter, additional aggregate TIDs are optionally selected from the ACs of lower QoS priority in accordance with the QoS priorities of the group of ACs.

9. The apparatus according to claim 1, wherein the TID aggregation limit parameter indicates a threshold of a number of aggregate TIDs for which MPDUs of the A-MPDU would be acknowledged by the AP as part of an immediate acknowledgement.

10. The apparatus according to claim 9, the processing circuitry further configured to, when the number of aggregate TIDs is less than or equal to the threshold, decode an immediate block acknowledgement (BA) message from the AP that includes a reception indication for MPDUs of the aggregate TIDs.

11. The apparatus according to claim 1, wherein:
the MPDUs of the aggregate TIDs are aggregated into the A-MPDU in accordance with a proportional TID aggregation, a priority based TID aggregation or a chronological aggregation,
for the proportional TID aggregation, numbers of MPDUs from the aggregate TIDs are based on a group of predetermined ratios for the aggregate TIDs,
for the priority based TID aggregation, the aggregation is performed sequentially with respect to the aggregate TIDs in accordance with descending QoS priorities of the ACs of the aggregate TIDs, and
for the chronological aggregation, the MPDUs are aggregated based on time indexes of the MPDUs of the aggregate TIDs.

12. The apparatus according to claim 1, wherein the STA is arranged to operate in accordance with a wireless local area network (WLAN) protocol.

13. The apparatus according to claim 1, wherein the processing circuitry includes a baseband processor to decode the TF and to encode the A-MPDU.

14. The apparatus according to claim 1, wherein the apparatus further includes a transceiver to receive the TF and to transmit the A-MPDU.

15. A non-transitory computer-readable storage medium that stores instructions for execution by one or more processors to perform operations for communication by a station (STA), the operations to configure the one or more processors to:
buffer medium access control (MAC) protocol data units (MPDUs) for an up link communication to an access point (AP), wherein the MPDUs are mapped to a master group of traffic identifiers (TIDs) based on traffic types of the MPDUs;
decode a trigger frame (TF) from the AP, wherein the TF includes a TID aggregation limit parameter;
select a group of aggregate TIDs from the master group of TIDs for aggregation of the buffered MPDUs into an aggregate MPDU (A-MPDU),
wherein a number of aggregate TIDs in the group is selected based on an immediate acknowledgement threshold, indicated by the TID aggregation limit parameter, for which the MPDUs of the aggregate TIDs that are included in the A-MPDU would be acknowledged, by the AP, as part of an immediate acknowledgement.

16. The non-transitory computer-readable storage medium according to claim 15, wherein:
the TIDs of the master group are mapped to a group of access classes (ACs) of a quality of service (QoS) prioritization,
wherein the TF further includes a preferred AC parameter that is configurable to indicate a preferred AC of the group of ACs, and
the aggregate TIDs are selected from the TIDs that are mapped to the ACs that are of equal or lower QoS priority than the preferred AC.

17. The non-transitory computer-readable storage medium according to claim 16, wherein the TF further includes a preferred AC preference level parameter that indicates whether the TIDs of the preferred AC are to be prioritized over other TIDs of the master group for the selection of the group of aggregate TIDs.

18. A method of communication by a station (STA), the method comprising
decoding a trigger frame (TF) from an access point (AP);
selecting a group of aggregate traffic identifiers (TIDs) from a group of TIDs that are active at the STA, wherein medium access control (MAC) protocol data units (MPDUs) buffered at the STA are mapped to the active TIDs based on traffic types of the MPDUs;
encoding for transmission to the AP, an aggregated MPDU (A-MPDU) that includes MPDUs of the aggregate TIDs,
wherein a number of aggregate TIDs selected is based on a TID aggregation limit parameter of the TF,
wherein the active TIDs are mapped to a group of access classes (ACs) of a quality of service (QoS) prioritization, and
wherein the selection of the aggregate TIDs is further based on a preferred AC parameter of the TF that is configurable to indicate a preferred AC of the group from which at least a portion of the aggregate TIDs are to be selected.

19. The method according to claim 18, wherein:
the group of ACs includes a voice AC of a highest QoS priority, a video AC of a second highest QoS priority, a best effort AC of a third highest QoS priority, and a background AC of a lowest QoS priority,
a first value of the preferred AC parameter indicates that the preferred AC is the voice AC,
a second value of the preferred AC parameter indicates that the preferred AC is the video AC,
a third value of the preferred AC parameter indicates that the preferred AC is the best effort AC.

20. An apparatus for an access point (AP), the apparatus comprising memory; and processing circuitry, configured to:
encode a trigger frame (TF) for transmission to a station (STA); and
decode an aggregated medium access control (MAC) protocol data unit (A-MPDU) from the STA that includes MAC protocol data units (MPDUs), wherein the MPDUs are mapped to a group of traffic identifiers (TIDs) based on traffic types of the MPDUs and the TIDs are mapped to a group of access classes (ACs) of a quality of service (QoS) prioritization;
wherein the TF includes a TID aggregation limit parameter that indicates a threshold of TIDs for the MPDUs of the A-MPDU for which the MPDUs would be acknowledged in an immediate block acknowledgement (BA) message, and
wherein the TF further includes a preferred AC parameter that is configurable to indicate a preferred AC for which MPDUs of TIDs mapped to ACs of QoS priority equal to or lower than the preferred AC are to be aggregated into the A-MPDU.

21. The apparatus according to claim 20, wherein:
the group of ACs includes a voice AC of a highest QoS priority, a video AC of a second highest QoS priority, a best effort AC of a third highest QoS priority, and a background AC of a lowest QoS priority,
a first value of the preferred AC parameter indicates that the preferred AC is the voice AC, a second value of the preferred AC parameter indicates that the preferred AC is the video AC, and a third value of the preferred AC parameter indicates that the preferred AC is the best effort AC.

22. The apparatus according to claim 20, wherein the TF further includes an AC preference level parameter that indicates whether the MPDUs of the TIDs of the preferred AC are to be prioritized over other MPDUs of other TIDs for the aggregation of the MPDUs into the A-MPDU.

23. The apparatus according to claim 22, wherein the TID aggregation limit parameter, the preferred AC parameter, and the AC preference level parameter are included in a type dependent per user information field of the TF.

24. The apparatus according to claim 20, wherein the AP is arranged to operate in accordance with a wireless local area network (WLAN) protocol.

25. The apparatus according to claim 20, wherein the processing circuitry includes a baseband processor to encode the TF and to decode the A-MPDU.

26. The apparatus according to claim 20, wherein the apparatus further includes a transceiver to transmit the TF and to receive the A-MPDU.

* * * * *